United States Patent [19]

Kikuchi et al.

[11] Patent Number: 5,378,519
[45] Date of Patent: Jan. 3, 1995

[54] ELECTROLUMINESCENT DEVICE

[75] Inventors: Toshihiro Kikuchi; Hajime Miyazaki, both of Yokohama; Takashi Nakano, Tokyo, all of Japan

[73] Assignee: Canon Kabushiki Kaisha, Tokyo, Japan

[21] Appl. No.: 52,460

[22] Filed: Apr. 26, 1993

[30] Foreign Application Priority Data

Apr. 28, 1992 [JP] Japan .................................. 4-134526
Apr. 28, 1992 [JP] Japan .................................. 4-134527

[51] Int. Cl.⁶ .............................................. B32B 9/04
[52] U.S. Cl. ................................. 428/690; 428/704; 428/917; 428/411.1; 428/426; 428/432; 428/457; 313/504
[58] Field of Search ............. 428/917, 411.1, 426, 428/432, 457, 690, 704; 430/59; 313/504; 252/301.16, 301.26

[56] References Cited

U.S. PATENT DOCUMENTS

| | | | |
|---|---|---|---|
| 3,172,862 | 3/1965 | Gurnee et al. | 252/301.3 |
| 3,173,050 | 3/1965 | Gurnee et al. | 313/108 |
| 3,710,617 | 1/1973 | Andersen | 73/116 |
| 4,356,429 | 10/1982 | Tang | 313/503 |
| 4,539,507 | 9/1985 | Van Slyke et al. | 313/504 |
| 4,720,432 | 1/1988 | VanSlyke et al. | 428/457 |
| 5,059,863 | 10/1991 | Tashiro et al. | 313/504 |
| 5,093,691 | 3/1992 | Utsugi et al. | 357/4 |
| 5,153,073 | 10/1992 | Ohnuma et al. | 428/461 |
| 5,247,226 | 9/1993 | Sato et al. | 313/504 |

FOREIGN PATENT DOCUMENTS

| | | | |
|---|---|---|---|
| 59-194393 | 11/1984 | Japan | H05B 33/14 |
| 63-264692 | 11/1988 | Japan | G09K 11/00 |
| 3163188 | 7/1991 | Japan | C09K 11/00 |

OTHER PUBLICATIONS

The Journal of Chemical Physics, vol. 38, No. 8, Apr. 15, 1963, M. Pope et al., pp. 2042–2043, "Electroluminescence In Organic Crystals."
The Journal of Chemical Physics, vol. 44, No. 8, Apr. 15, 1965, W. Helfinnch et al., pp. 2902–2909, "Transients of Volume—Controlled Current and of Recombination Radiation in Anthracene."
The Journal of Chemical Physics, Feb. 1973, pp. 1544–1547, H. P. Schwob et al., "Exciton Fission in Anthracene Crystals."
Physical Review Letters, vol. 14, No. 7, Feb. 15, 1965, pp. 230–231.
Chemical Physics Letters, vol. 36, No. 3, Nov. 15, 1975, pp. 345–348, J. Kalinowski et al., "Magnetic Field Effects on Recombination Radiation in Tetracene Crystal."
Thin Solid Films; Electronics and Optics, vol. 94, No. 2, (List continued on next page.)

Primary Examiner—Patrick J. Ryan
Assistant Examiner—Marie R. Macholl
Attorney, Agent, or Firm—Fitzpatrick, Cella, Harper & Scinto

[57] ABSTRACT

An electroluminescent device is constituted by disposing an organic compound layer between a pair of electrodes. An improved output is given by including in the organic compound layer a compound having a skeleton of the following formula (II) and having a carbonyl group:

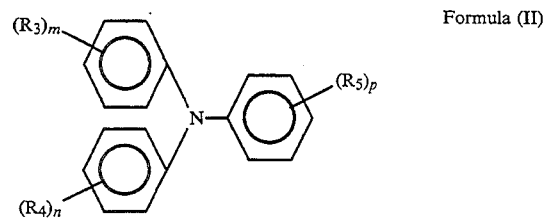

Formula (II)

wherein $R_3$, $R_4$ and $R_5$ independently denote an alkyl group, an aromatic ring group, a heterocyclic group, an alkoxy group, an aryloxy group, a halogen atom, nitro, cyano, hydroxyl, or amino, and m, n and p independently denote 0 or an integer of up to 5.

9 Claims, 1 Drawing Sheet

OTHER PUBLICATIONS

Aug. 13, 1982, pp. 171–183, P.S. Vincett et al., "Electrical Conduction and Low Voltage Blue Electroluminescence in Vacuum—Deposited Organic Films."

Polymer, vol. 24, No. 6, Jun. 1983, R. H. Partridge, pp. 748–754. "Electroluminescence From Polyvinylcarbazole Films: 3. Electroluminescent Devices."

Japanese Journal of Applied Physics, JJAP Letters, S. Hayashi et al., pp. L773–775, "Electroluminescence of Perylene Films with a Conducting Polymer as an Anode."

Applied Physics Letters, vol. 51, No. 12, Sep. 21, 1987, pp. 913–915, C. W. Tang et al., "Organic Electroluminescent Diodes."

Japanese Journal of Applied Physics, vol. 27, No. 2, Feb. 1988, pp. L269–L271, C. Adachi et al., "Electroluminescence in Organic Films with Three-Layer Structure."

Japanese Journal of Applied Physics, vol. 27, No. 4, Apr., 1988, pp. L713–L715, C. Adachi et al., "Organic Electroluminescent Device with a Three-Layer Structure."

The Journal of Chemical Physics, vol. 50, No. 10, May 15, 1969, M. Schadt et al., "Low-Temperature Hole Injection and Hole Trap Distribution in Anthracene."

50th Scientific Lecture Meeting 1989 and English Abstract.

51st Scientific Lecture Meeting 1990 and English Abstract.

38th Joint Lecture Meeting of Japan 1991 and English Abstract.

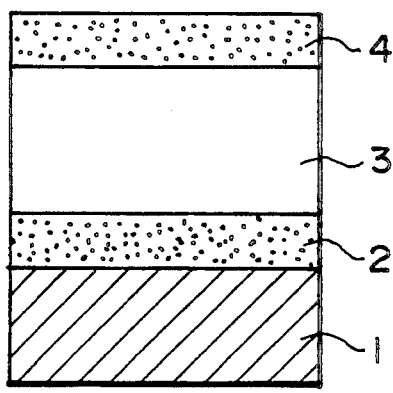
F I G. 1
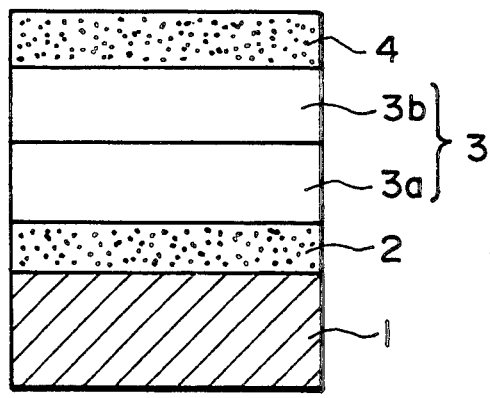
F I G. 2
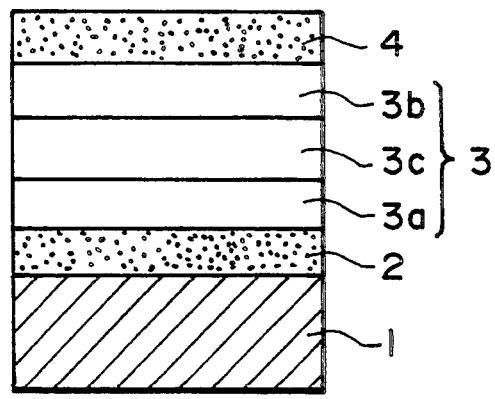
F I G. 3

ELECTROLUMINESCENT DEVICE

FIELD OF THE INVENTION AND RELATED ART

The present invention relates to an electroluminescent device for emitting light under application of an electric field.

Electroluminescence of an organic material was observed by Pope, et al. in 1963 with respect to anthracene single crystal (J. Chem. Phys. 38 (1963) 2042). Subsequently, in 1965, Helfinnch and Schneider succeeded in observation of relatively intense injection-type electroluminescence (hereinafter, "electroluminescence" or "electroluminescent" being sometimes abbreviated as "EL") by using a solution-electrode system with a good injection efficiency (Phys. Rev. Lett. 14 (1965) 229). Since then, organic luminescent substances composed of a conjugated organic host substance and a conjugated organic activator having a condensed benzene ring have been studied as reported in U.S. Pat. Nos. 3,172,862, 3,173,050 and 3,710,617, J. Chem. Phys. 44 (1966) 2902, J. Chem. Phys. 50 (1969) 4364, J. Chem. Phys. 58 (1973) 1542, and Chem. Phys. Lett. 36 (1975) 345. Examples of the organic host substance include naphthalene, anthracene, phenanthrene, tetracene, pyrene, benzopyrene, chrysens, picene, carbazole, fluorene, biphenyl, terphenyl, triphenylene oxide, dihalobiphenyl, trans-stilbene, and 1,4-diphenylbutadiene. Examples of the activator include anthracene, tetracene and pentacene. These organic luminescent substances were all produced in a single layer having a thickness in excess of 1 μm so that the luminescence required a high electric field. For this reason, film devices formed by vacuum deposition have been studied (e.g. in Thin Solid Films, 94 (1982) 171; Polymer, 24 (1983) 748; and Jpn. J. Appl. Phys., 25 (1986) L 773). The thin film formation was effective in reduction in drive voltage, but it has still been impossible to obtain a device with a high luminance of a practical level.

Recently, Tanng, et al. devised an EL device comprising a laminate of two very-thin layers (a charge-transporting layer and a luminescent layer) formed by vacuum deposition disposed between an anode and a cathode, and the device was driven at a low voltage to realize a high luminance (Appl. Phys, Lett. 51 (1987) 913 or U.S. Pat. No. 4,356,429). Thereafter, such lamination-type organic EL devices have been actively studied and reported in, e.g., Japanese Laid-Open Patent Application (JP-A) 59-194393, U.S. Pat. No. 4,539,507, JP-A 59-194393, U.S. Pat. No. 4,720,432, JP-A 63-264692, Appl. Phys. Lett. 55 (1986) 1467, and JP-A 3-163188.

Further, there has been reported a EL device having a three-layer structure wherein carrier transportation and luminescence are functionally separated in Jpn. J. Appl. Phys., 27 (1988) L269, L713. Further, regarding the selection of colorants in the luminescent layer determining the luminescent hues, the restriction based on carrier-transporting performance has been alleviated to increase the latitude of colorant selection. There has also been suggested a possibility of increasing the luminescent performance by effectively confining holes and electrons (or excitons) to the central luminescent layer.

Vacuum deposition has been generally used for preparing lamination-type organic EL devices but devices providing a substantial luminance have been reported to be also produced by casting (e.g., Preprint for 50-th Scientific Lecture Meeting of Jpn. Applied Physics Society, page 1006 (1989), and Preprint for 51-th Scientific Lecture Meeting of Jpn. Applied Physic Society, page 1041 (1990).

It has been also reported that a considerably high luminous efficiency could be obtained by a mixture mono-layer type EL device formed by dip-coating from a solution mixture of polyvinyl carbazole as a hole-transporting compound, an oxadiazole derivative as an electron-transporting compound and coumarin 6 as a luminescent substance (e.g., Preprint for 38-th Joint Lecture Meeting of Jpn. Societies relating to Appl. Physics, page 1086 (1991).

As described above, the recent development in the field of organic EL devices is remarkable and suggests a possibility of wide applicability thereof. However, the history of study thereof is still short, and studies on materials and device formation have not been sufficiently performed. At present, there are still left problems regarding optical output of a still higher luminance and durability, such as change with time over a long period of use and deterioration due to oxygen-containing atmosphere and moisture. Further, a satisfactory solution has not been given to the problem of diversification of emission wavelengths required for accurately selecting luminescent hues of blue, green and red in view of application to, e.g., a full-color display.

SUMMARY OF THE INVENTION

A principal object of the present invention is to provide an electron-transporting device having an optical output of a very high luminance.

Another object of the present invention is to provide an electron-transporting device which can be produced easily and at a relatively low cost.

According to the present invention, there is provided an electroluminescent device, comprising: a pair of electrodes, and an organic compound layer disposed between the electrodes and comprising a compound having a skeleton of the following formula (I) and having a carbonyl group:

Formula (I)

wherein $R_1$ and $R_2$ independently denote an alkyl group, an aralkyl group, an aromatic ring group or a heterocyclic group, and $Ar_1$ denotes an aromatic ring group or a heterocyclic group, with the proviso that $R_1$ and $R_2$ can be connected to form a ring with the nitrogen atom in the formula, and each of $R_1$, $R_2$ and $Ar_1$ can have a substituent.

These and other objects, features and advantages of the present invention will become more apparent upon a consideration of the following description of the preferred embodiments of the present invention taken in conjunction with the accompanying drawings.

BRIEF DESCRIPTION OF THE DRAWING

FIGS. 1 through 3 are respectively a sectional view showing an embodiment of the electroluminescent device according to the invention.

DETAILED DESCRIPTION OF THE INVENTION

FIG. 1 shows a sectional structure of an electroluminescent device according to an embodiment of the present invention. As shown in FIG. 1, the electroluminescent device has a laminated structure including an organic compound layer 3 disposed between a pair of electrodes 2 and 4. In this embodiment, the laminated structure is supported on a substrate 1, but the substrate 1 may be omitted if desired. The organic compound layer 3 comprises a compound having a skeleton of the following formula (I) and having a carbonyl group (hereinafter simply referred to as a "compound of the formula (I)":

Formula (I)

wherein $R_1$ and $R_2$ independently denote an alkyl group, an aralkyl group, an aromatic ring group or a heterocyclic group, and $Ar_1$ denotes an aromatic ring group or a heterocyclic group, with the proviso that $R_1$ and $R_2$ can be connected to form a ring with the nitrogen atom in the formula, and each of $R_1$, $R_2$ and $Ar_1$ can have a substituent.

The alkyl group for $R_1$ and $R_2$ may preferably have 1–6 carbon atoms, and preferred examples of the aralkyl group may include benzyl, phenethyl, and naphthylmethyl.

The aromatic group for $R_1$, $R_2$ and $Ar_1$ may preferably be, for example, phenyl, naphthyl, anthryl or pyrenyl. The heterocyclic group may preferably be, for example, pyridyl, thienyl, furyl or quinolyl.

Examples of the substituent for $R_1$, $R_2$ and $Ar_1$ may include: alkyl groups having 1–6 carbon atoms; aralkyl groups, such as benzyl, phenethyl and naphthylmethyl; aromatic ring group, such as phenyl, naphthyl, anthryl and pyrenyl; heterocyclic groups, such as pyridyl, thienyl, furyl and quinolyl; alkoxy groups, such as methoxy, ethoxy and propoxy; halogen atoms, such as fluorine, chlorine and bromine; nitro, cyano, hydroxyl, and amino.

Among the compounds of the formula (I), a compound having an amine skeleton of the following formula (II) and a carbonyl group (hereinafter simply referred as a "compound of the formula (II)") is preferred.

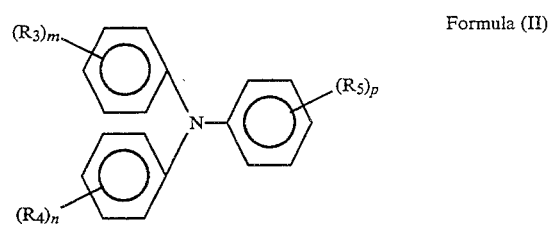

Formula (II)

wherein $R_3$, $R_4$ and $R_5$ independently denote an alkyl group, an aromatic ring group, a heterocyclic group, an alkoxy group, an aryloxy group, a halogen atom, nitro, cyano, hydroxyl, or amino, and m, n and p independently denote 0 or an integer of up to 5.

The alkyl group for $R_3$, $R_4$ and $R_5$ may preferably have 1–6 carbon atoms, and preferred examples of the aralkyl group may include benzyl, phenethyl, and naphthylmethyl.

The aromatic group for $R_3$, $R_4$ and $R_5$ may preferably be, for example, phenyl, naphthyl, anthryl or pyrenyl. The heterocyclic group may preferably be, for example, pyridyl, thienyl, furyl or quinolyl. The alkoxy group may preferably be, for example, methoxy, ethoxy or propoxy. The aryloxy group may preferably be, for example, phenoxy or naphthoxy. The halogen atom may preferably be, for example, fluorine, chlorine or bromine.

Hereinbelow, some representative examples of the compound of the formula (I) are enumerated but they are not exhaustive.

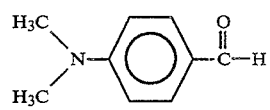

Comp. Ex. 1

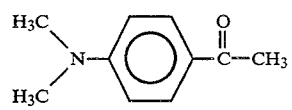

Comp. Ex. 2

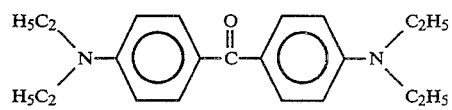

Comp. Ex. 3

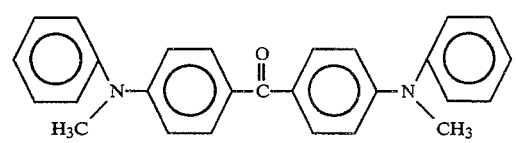

Comp. Ex. 4

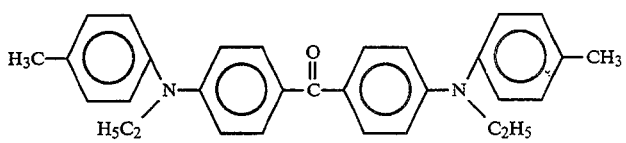
Comp. Ex. 5
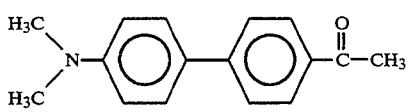
Comp. Ex. 6
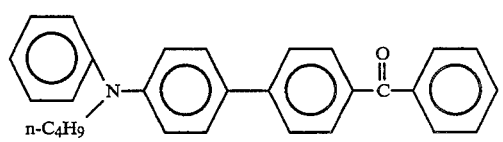
Comp. Ex. 7
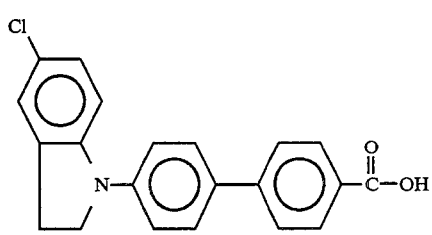
Comp. Ex. 8
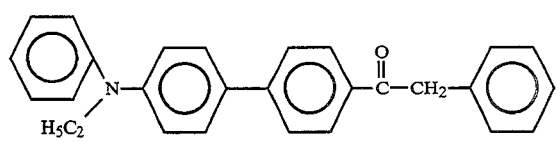
Comp. Ex. 9
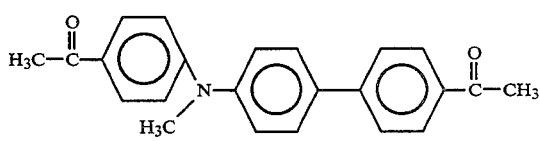
Comp. Ex. 10
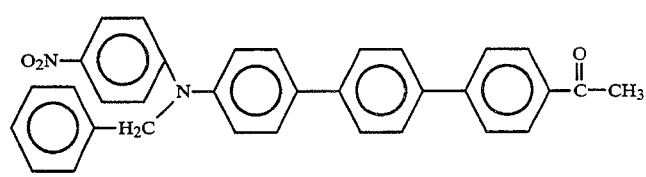
Comp. Ex. 11
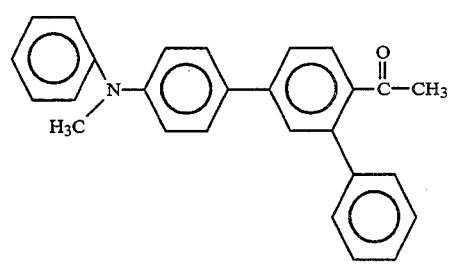
Comp. Ex. 12
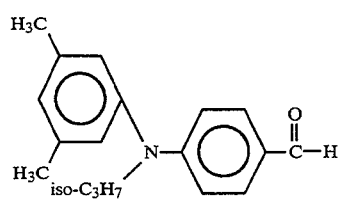
Comp. Ex. 13

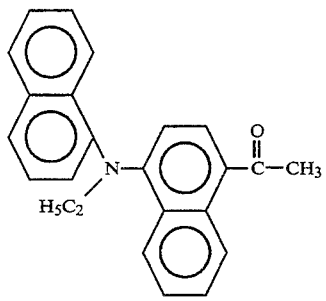
Comp. Ex. 14
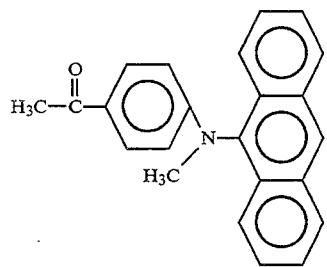
Comp. Ex. 15
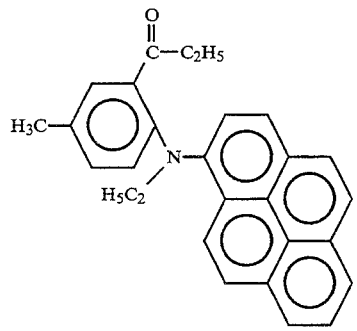
Comp. Ex. 16
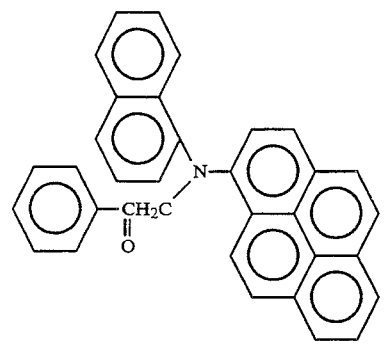
Comp. Ex. 17
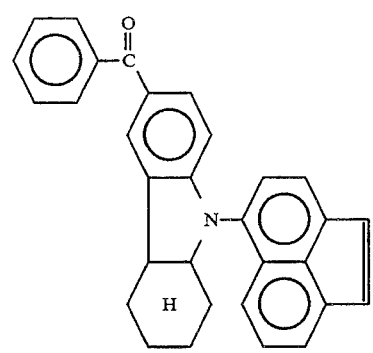
Comp. Ex. 18

-continued
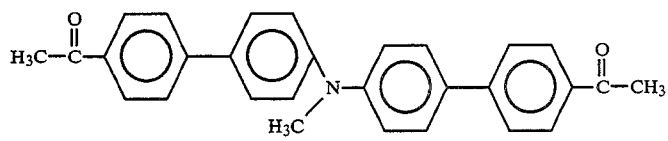
Comp. Ex. 19
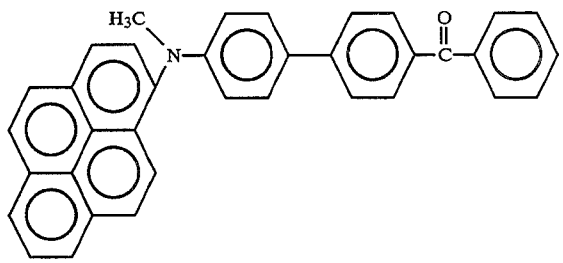
Comp. Ex. 20
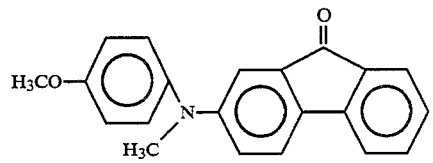
Comp. Ex. 21
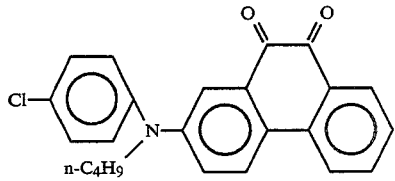
Comp. Ex. 22
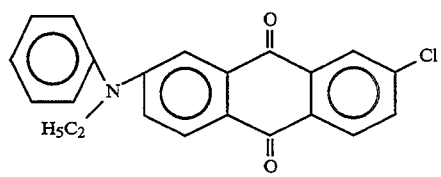
Comp. Ex. 23
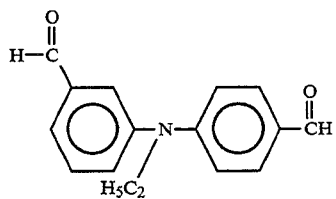
Comp. Ex. 24
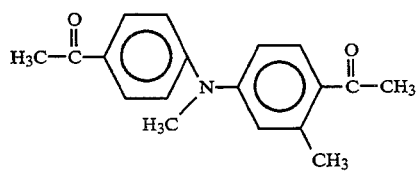
Comp. Ex. 25
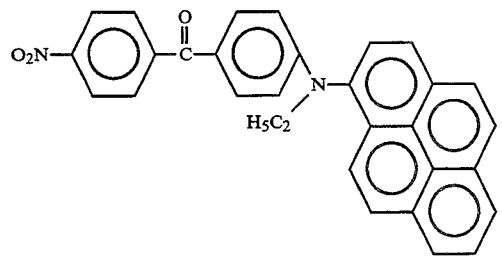
Comp. Ex. 26

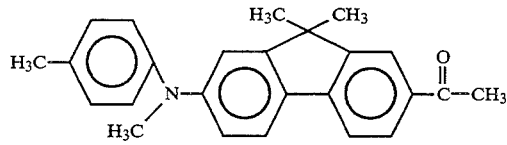 Comp. Ex. 27
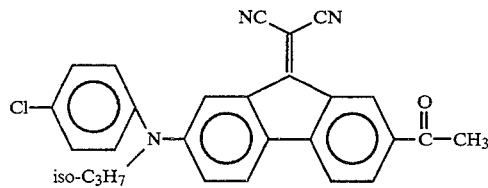 Comp. Ex. 28
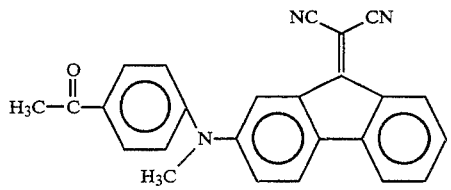 Comp. Ex. 29
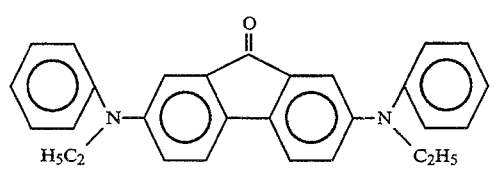 Comp. Ex. 30
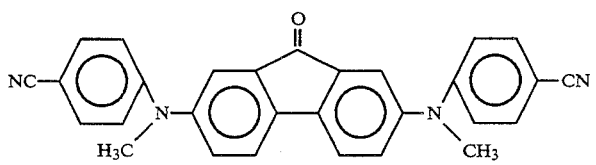 Comp. Ex. 31
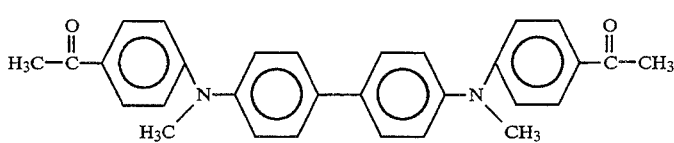 Comp. Ex. 32
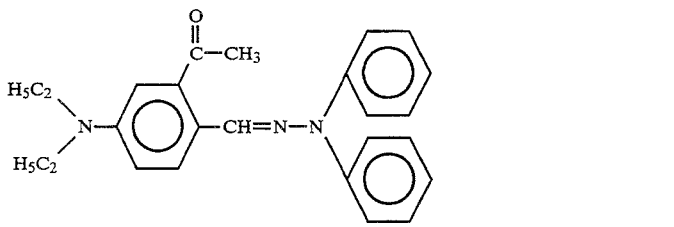 Comp. Ex. 33
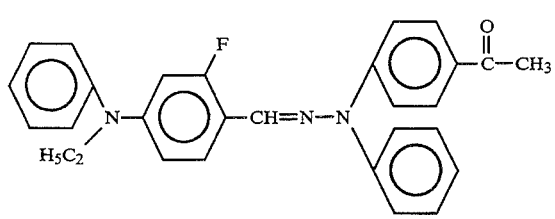 Comp. Ex. 34
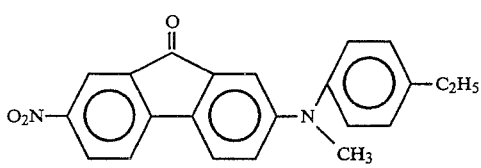 Comp. Ex. 35

-continued
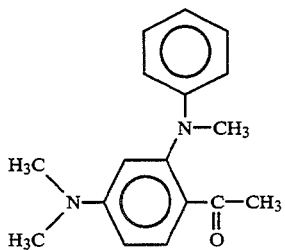
Comp. Ex. 36
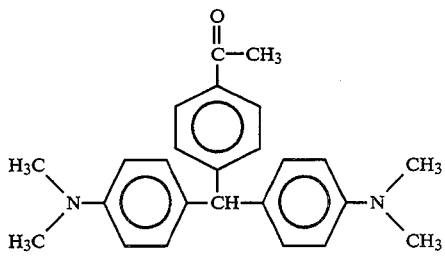
Comp. Ex. 37
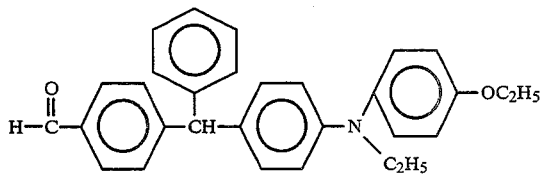
Comp. Ex. 38
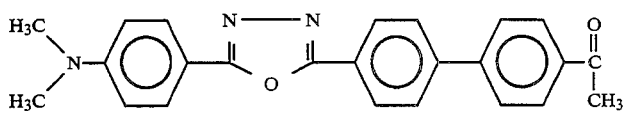
Comp. Ex. 39
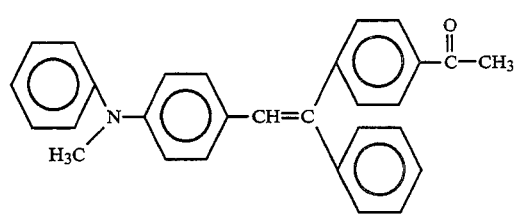
Comp. Ex. 40
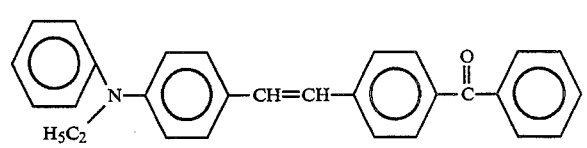
Comp. Ex. 41
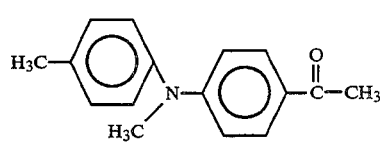
Comp. Ex. 42
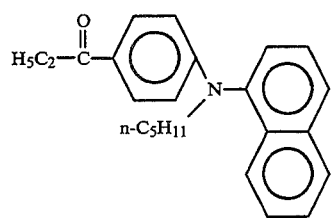
Comp. Ex. 43

-continued
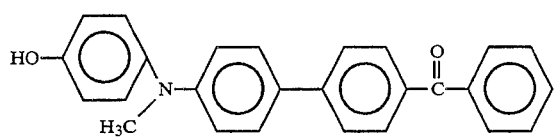
Comp. Ex. 44
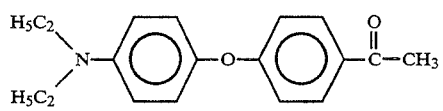
Comp. Ex. 45
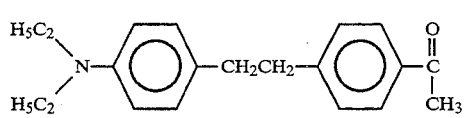
Comp. Ex. 46
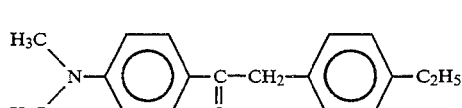
Comp. Ex. 47
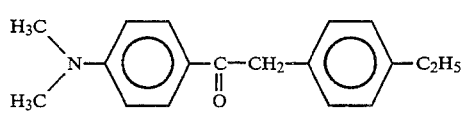
Comp. Ex. 48
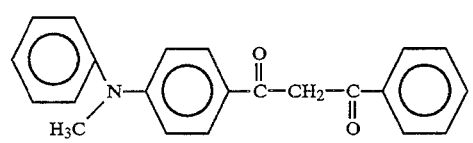
Comp. Ex. 49
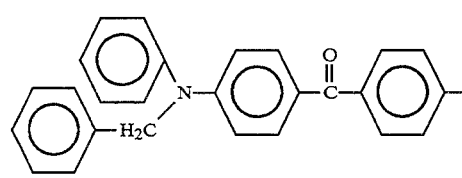
Comp. Ex. 50
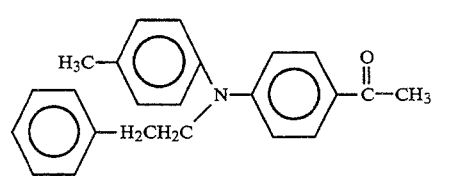
Comp. Ex. 51
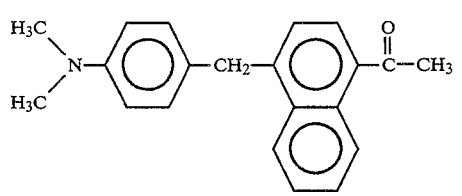
Comp. Ex. 52
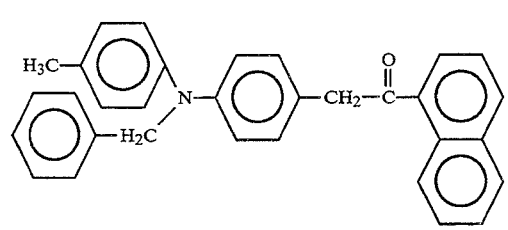
Comp. Ex. 53
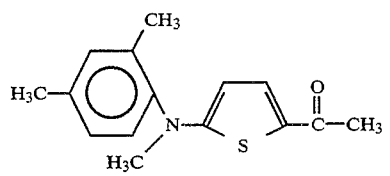

-continued
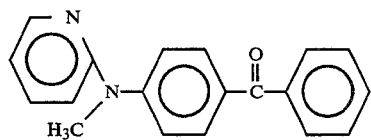
Comp. Ex. 54
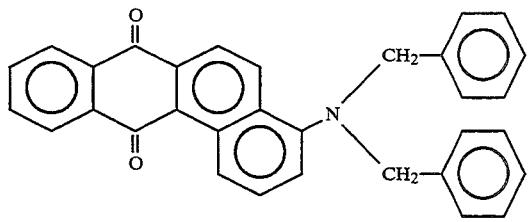
Comp. Ex. 55
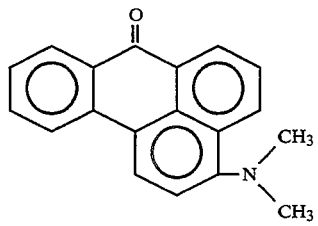
Comp. Ex. 56
Comp. Ex. 57
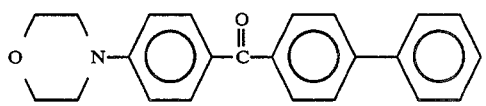
Comp. Ex. 58
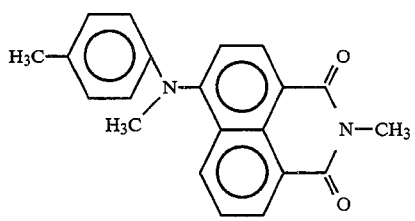
Comp. Ex. 59
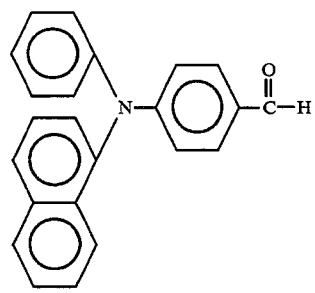
Comp. Ex. 60
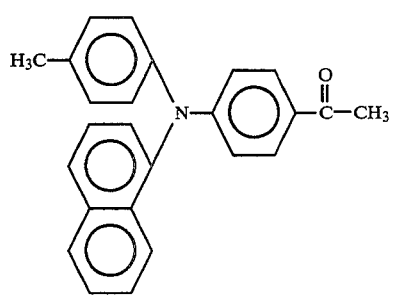
Comp. Ex. 61

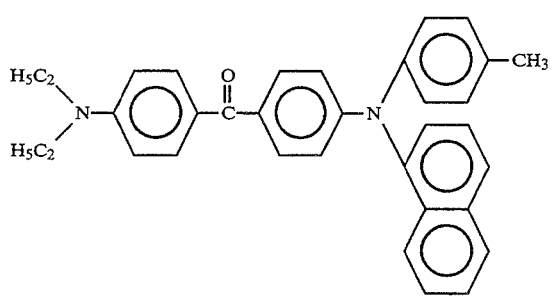
Comp. Ex. 62
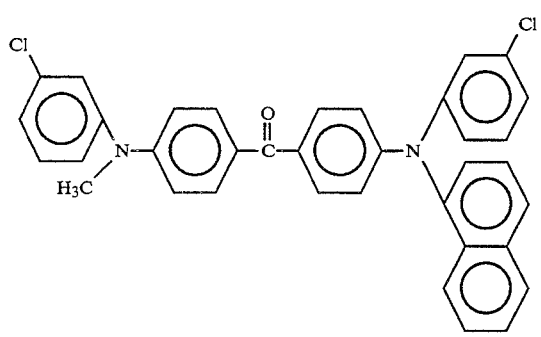
Comp. Ex. 63
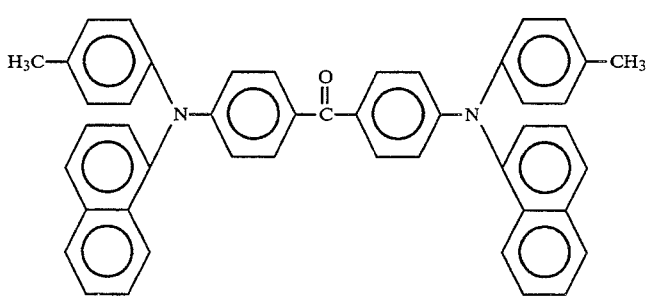
Comp. Ex. 64
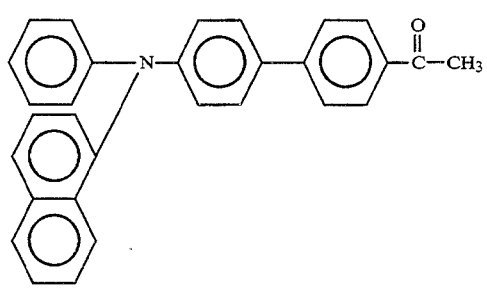
Comp. Ex. 65
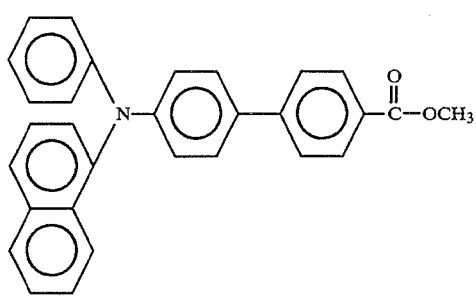
Comp. Ex. 66

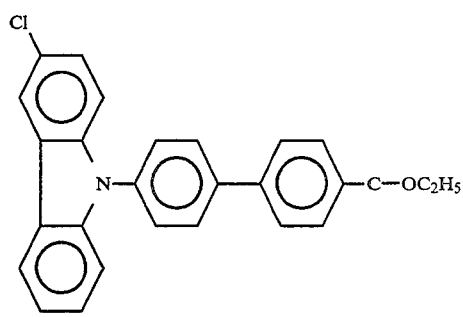
Comp. Ex. 67
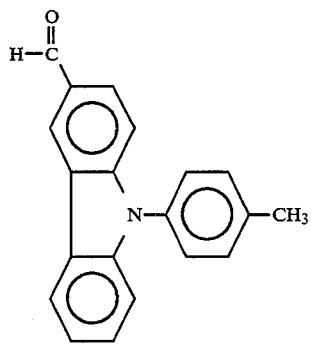
Comp. Ex. 68
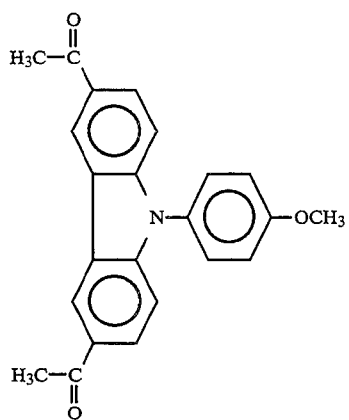
Comp. Ex. 69
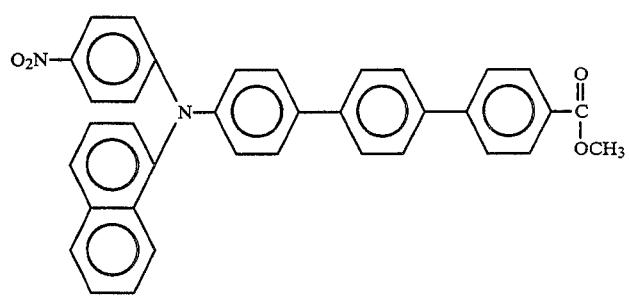
Comp. Ex. 70
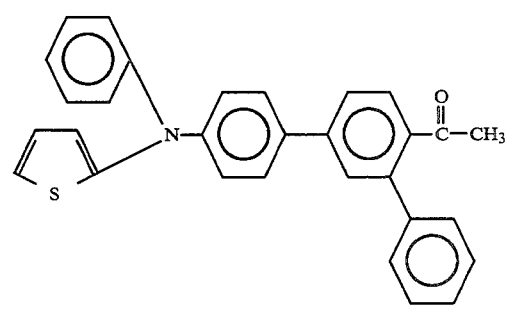
Comp. Ex. 71

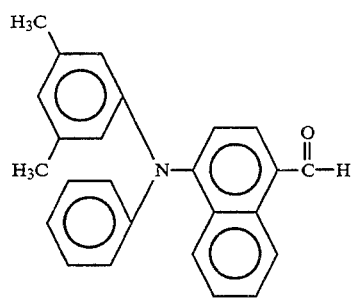
Comp. Ex. 72
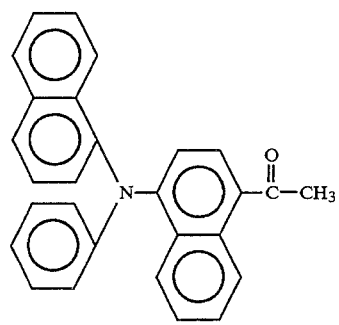
Comp. Ex. 73
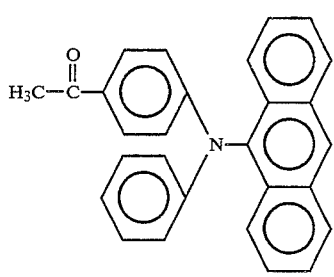
Comp. Ex. 74
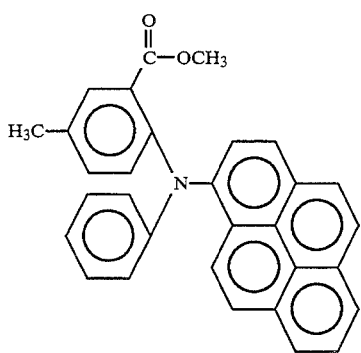
Comp. Ex. 75
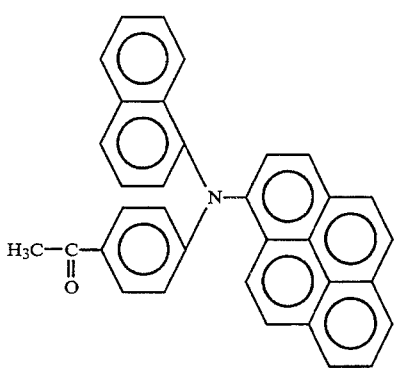
Comp. Ex. 76

-continued
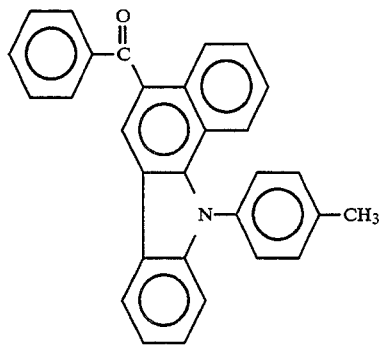
Comp. Ex. 77
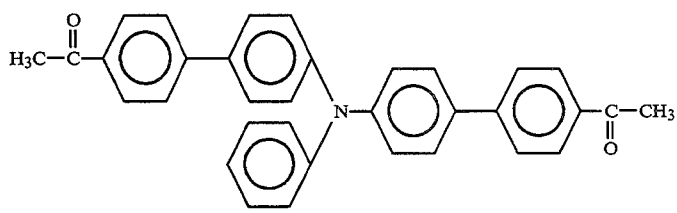
Comp. Ex. 78
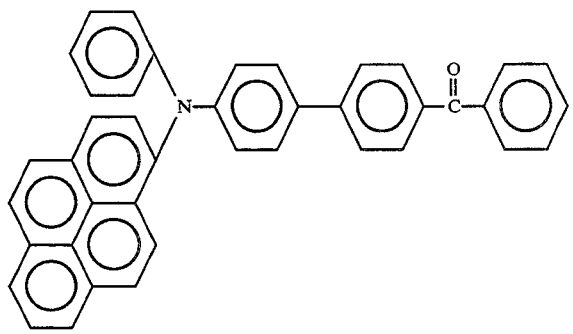
Comp. Ex. 79
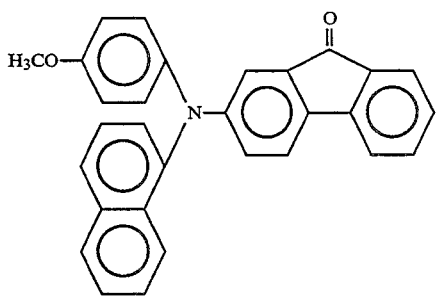
Comp. Ex. 80
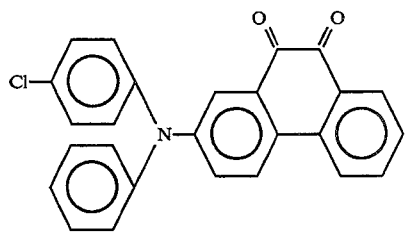
Comp. Ex. 81

-continued
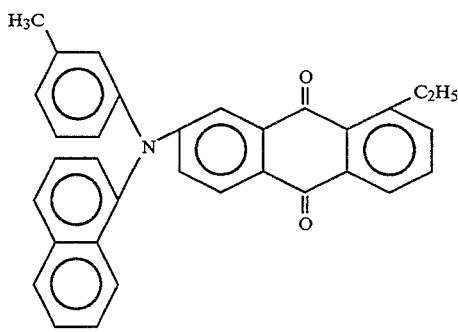
Comp. Ex. 82
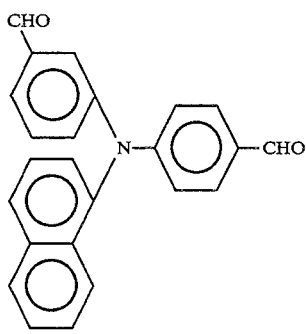
Comp. Ex. 83
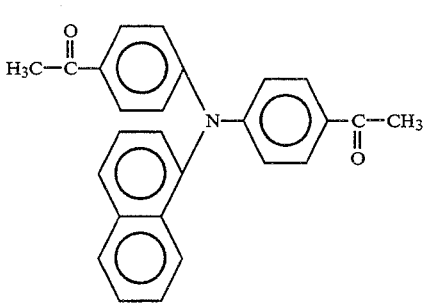
Comp. Ex. 84
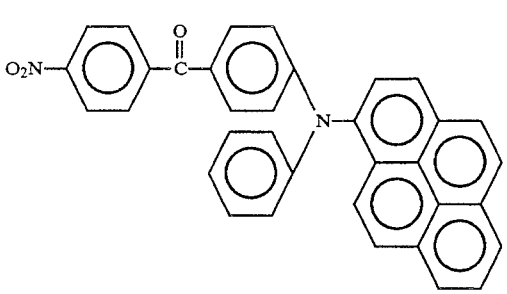
Comp. Ex. 85
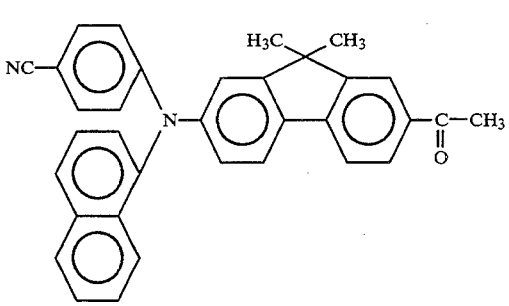
Comp. Ex. 86

-continued
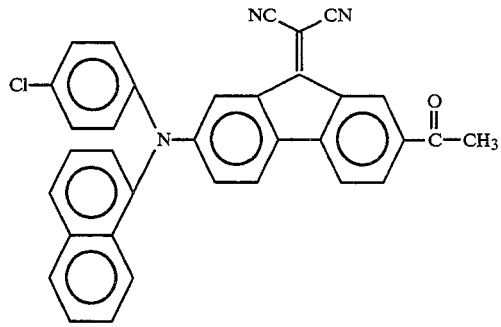
Comp. Ex. 87
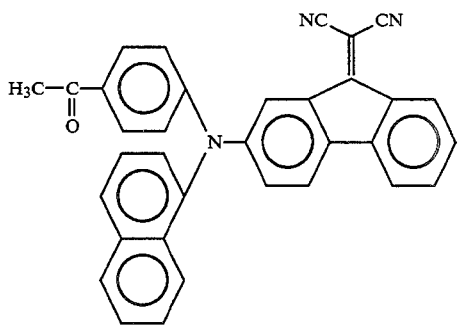
Comp. Ex. 88
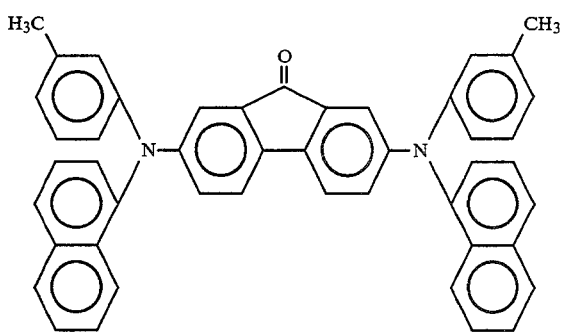
Comp. Ex. 89
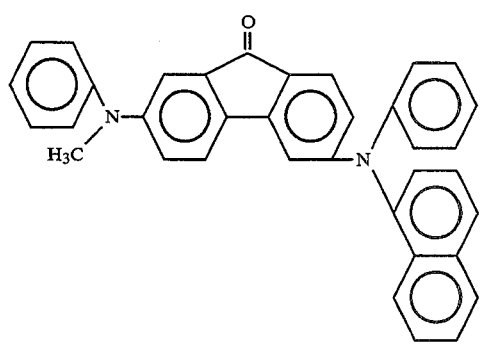
Comp. Ex. 90
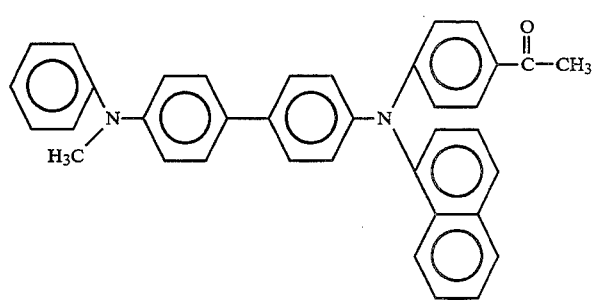
Comp. Ex. 91

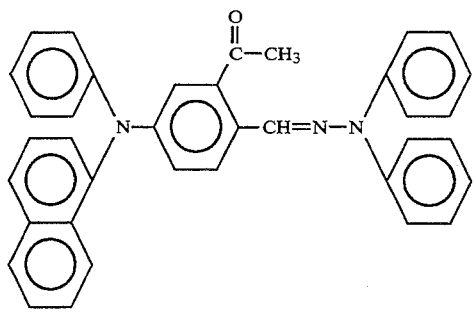
Comp. Ex. 92
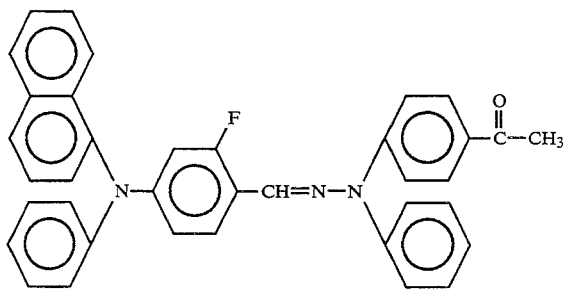
Comp. Ex. 93
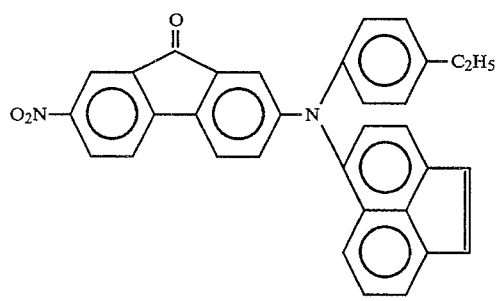
Comp. Ex. 94
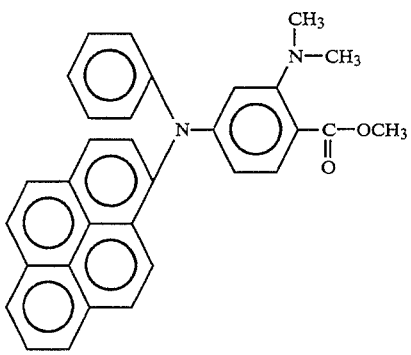
Comp. Ex. 95
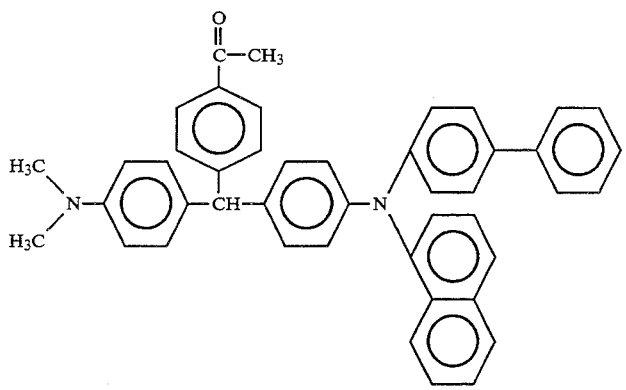
Comp. Ex. 96

-continued
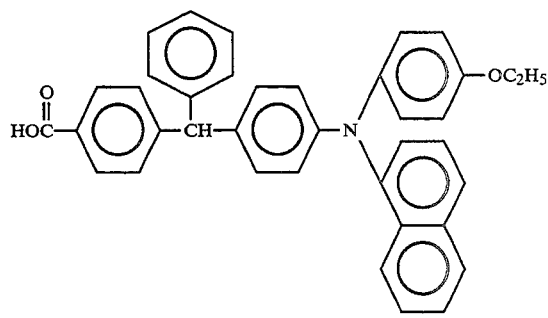
Comp. Ex. 97
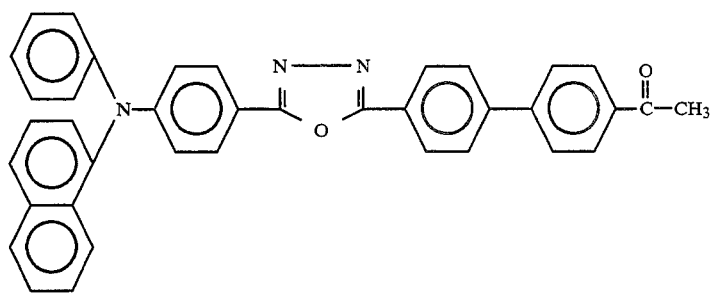
Comp. Ex. 98
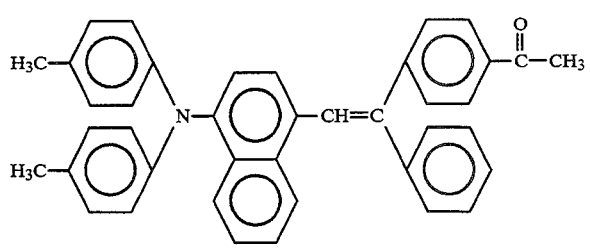
Comp. Ex. 99
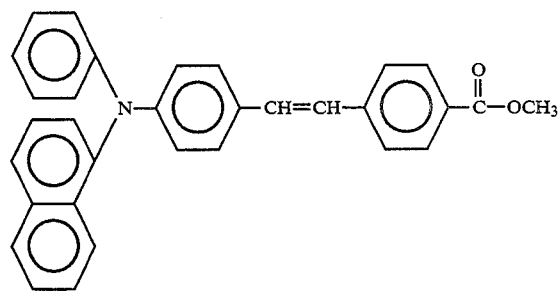
Comp. Ex. 100
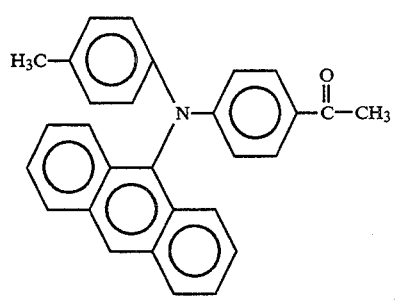
Comp. Ex. 101

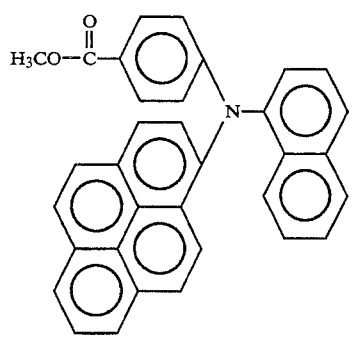
Comp. Ex. 102
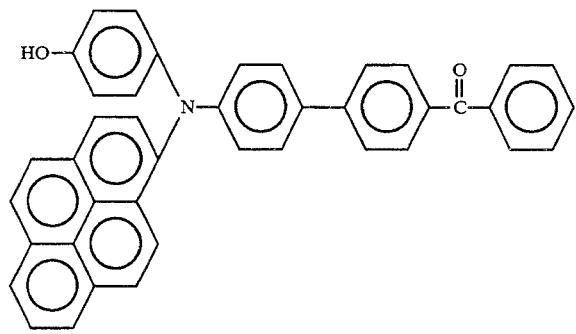
Comp. Ex. 103
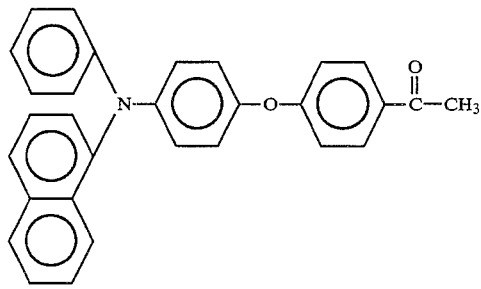
Comp. Ex. 104
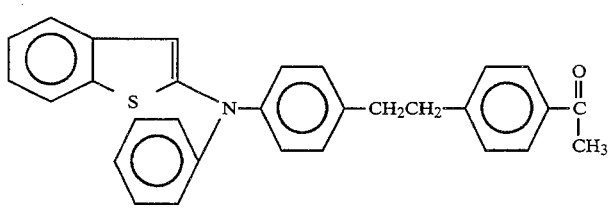
Comp. Ex. 105
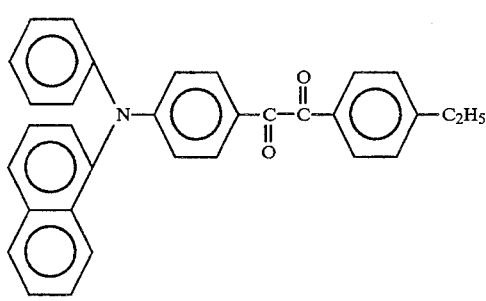
Comp. Ex. 106

-continued
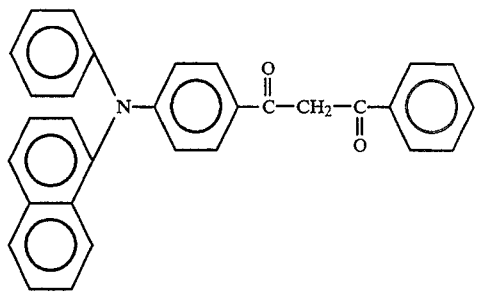
Comp. Ex. 107
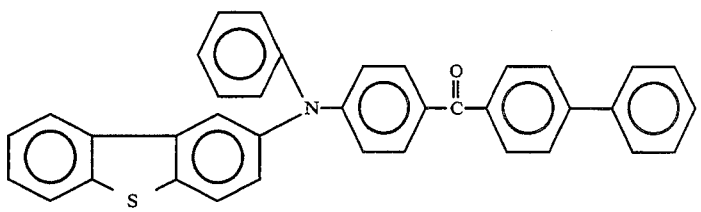
Comp. Ex. 108
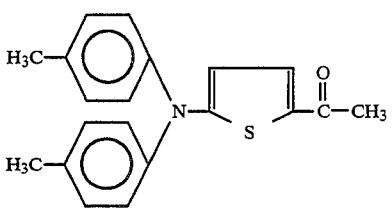
Comp. Ex. 109
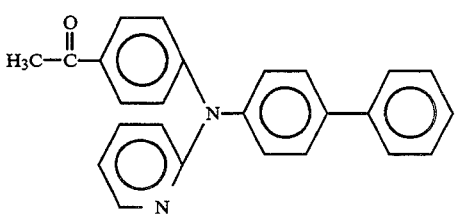
Comp. Ex. 110
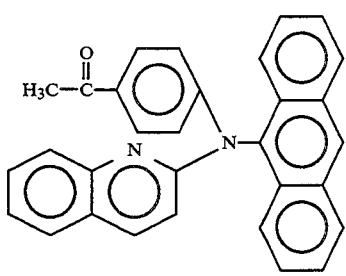
Comp. Ex. 111
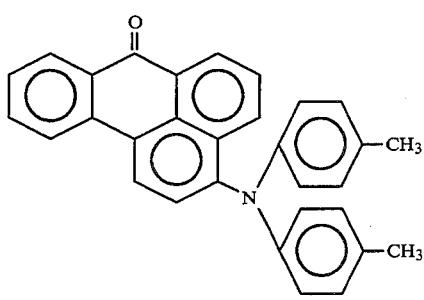
Comp. Ex. 112

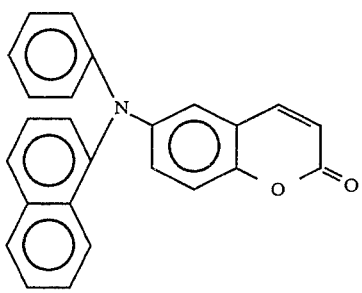
Comp. Ex. 113
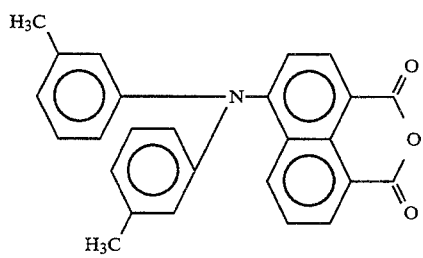
Comp. Ex. 114
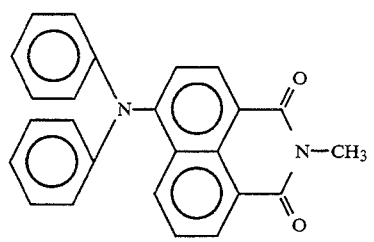
Comp. Ex. 115
Representative examples of the compound of the formula (II), a special class of compounds among the compounds of the formula (I), are enumerated hereinbelow.
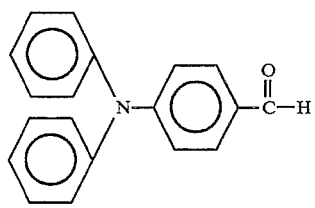
Comp. Ex. II-1
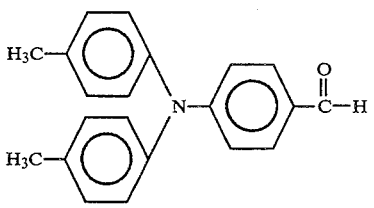
Comp. Ex. II-2
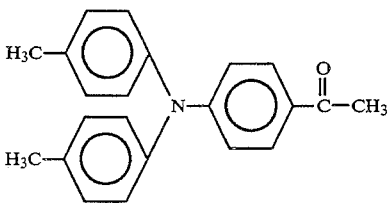
Comp. Ex. II-3

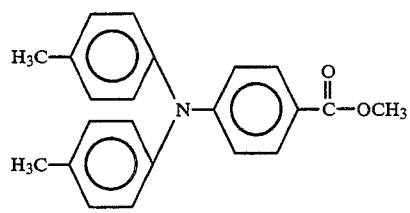
Comp. Ex. II-4
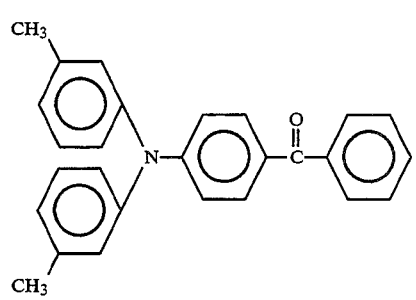
Comp. Ex. II-5
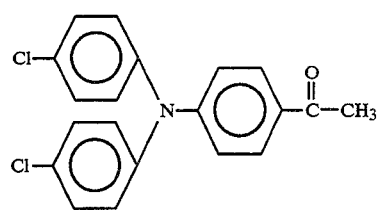
Comp. Ex. II-6
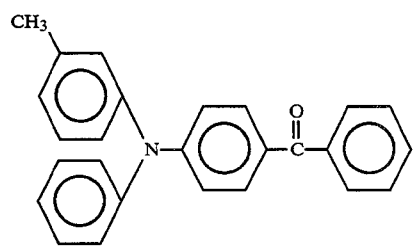
Comp. Ex. II-7
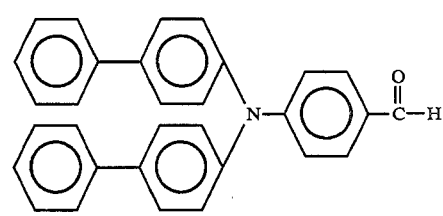
Comp. Ex. II-8
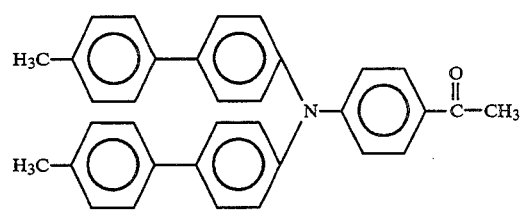
Comp. Ex. II-9
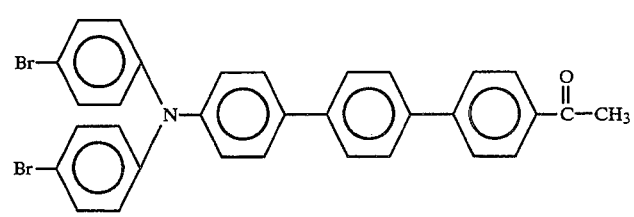
Comp. Ex. II-10

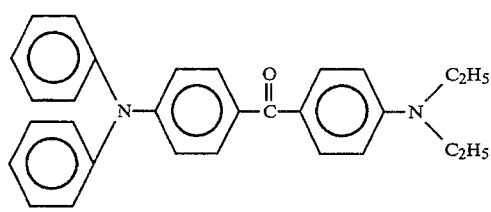
Comp. Ex. II-11
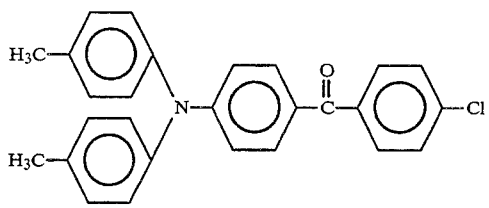
Comp. Ex. II-12
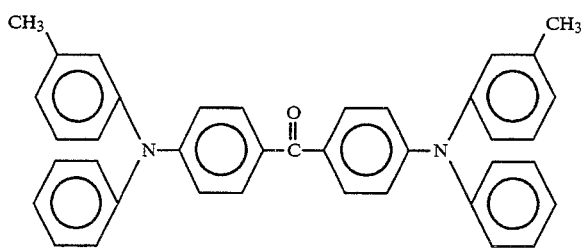
Comp. Ex. II-13
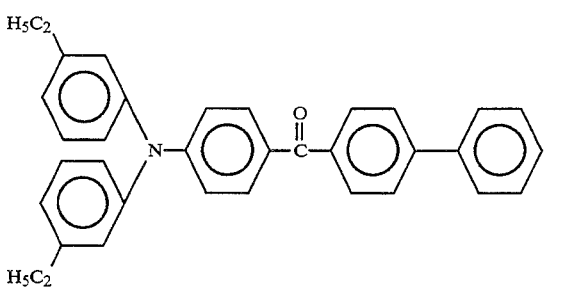
Comp. Ex. II-14
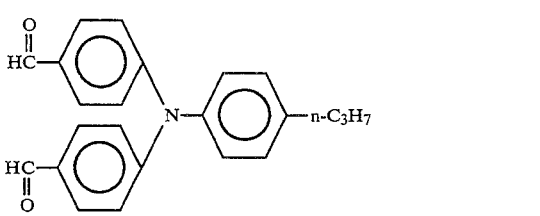
Comp. Ex. II-15
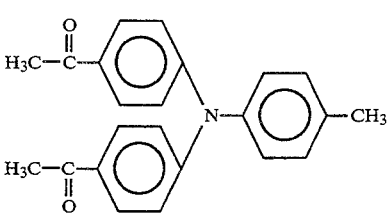
Comp. Ex. II-16
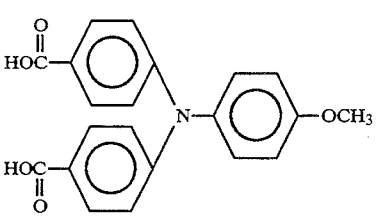
Comp. Ex. II-17

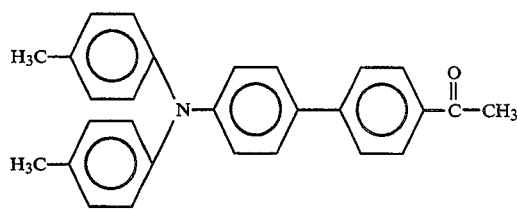
Comp. Ex. II-18
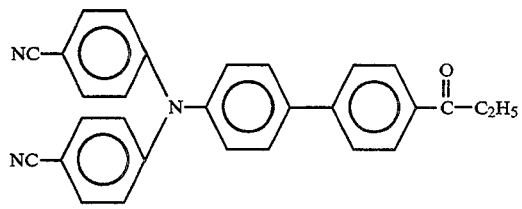
Comp. Ex. II-19
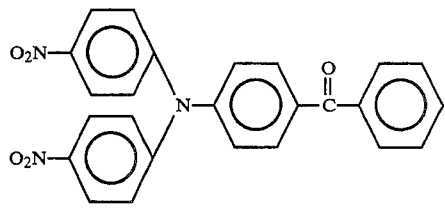
Comp. Ex. II-20
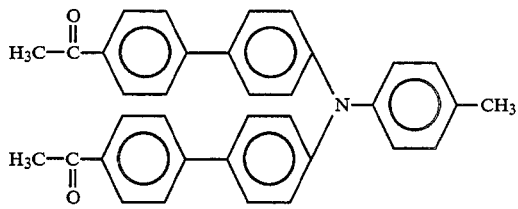
Comp. Ex. II-21
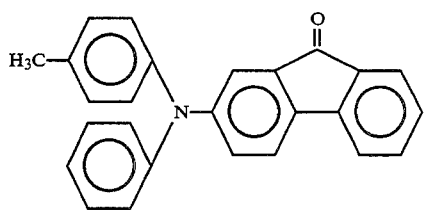
Comp. Ex. II-22
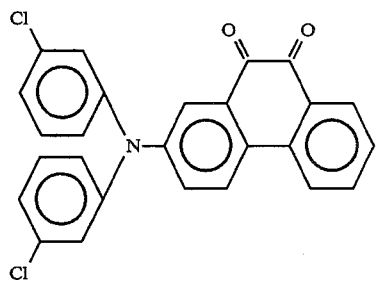
Comp. Ex. II-23
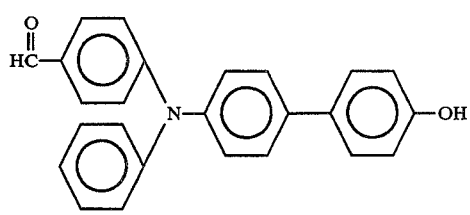
Comp. Ex. II-24

-continued
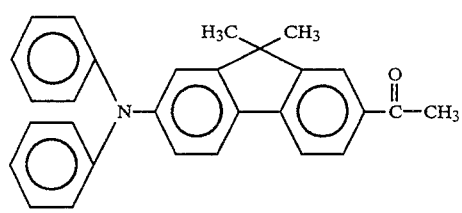
Comp. Ex. II-25
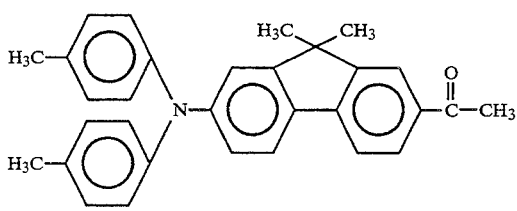
Comp. Ex. II-26
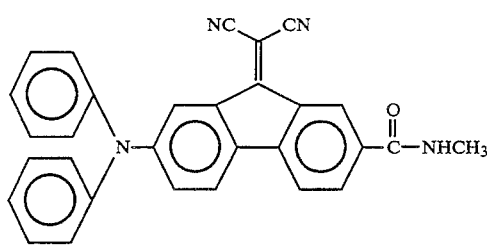
Comp. Ex. II-27
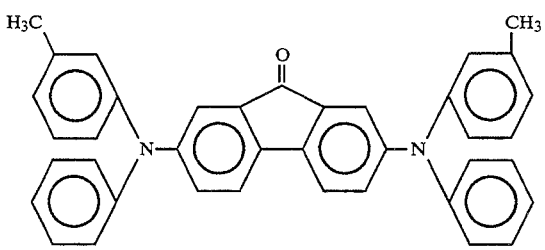
Comp. Ex. II-28
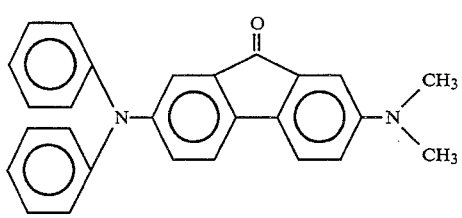
Comp. Ex. II-29
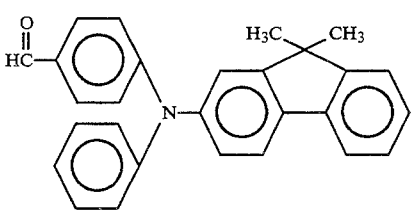
Comp. Ex. II-30
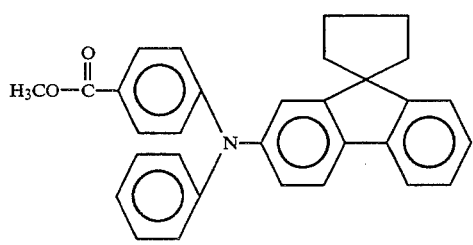
Comp. Ex. II-31

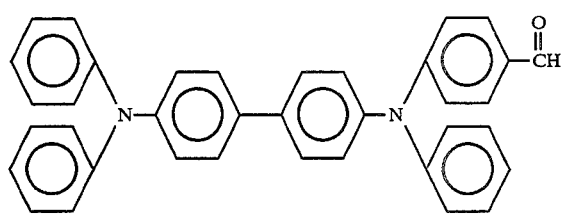
Comp. Ex. II-32
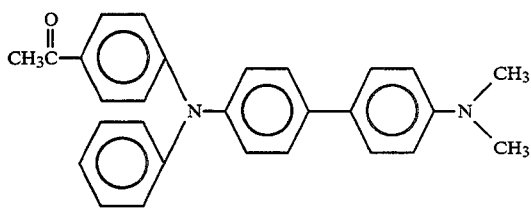
Comp. Ex. II-33
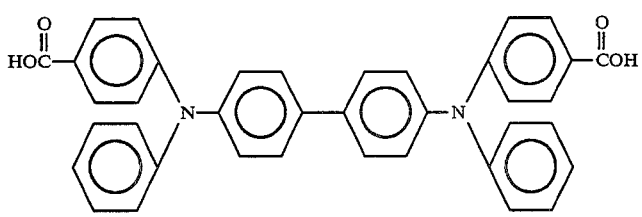
Comp. Ex. II-34
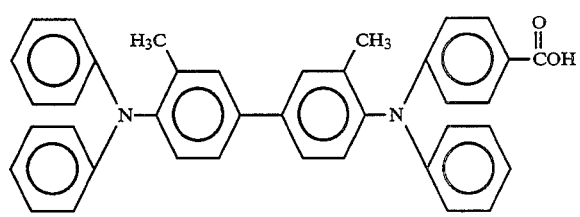
Comp. Ex. II-35
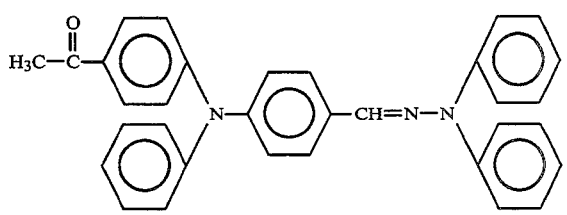
Comp. Ex. II-36
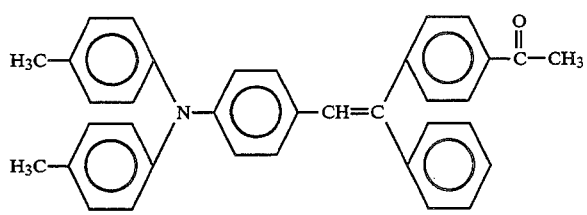
Comp. Ex. II-37
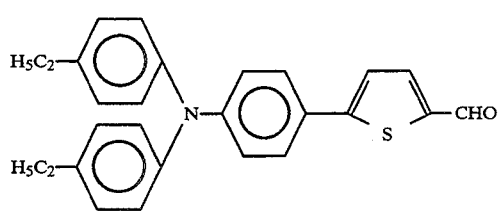
Comp. Ex. II-38

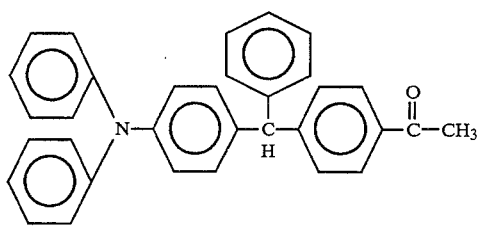
Comp. Ex. II-39
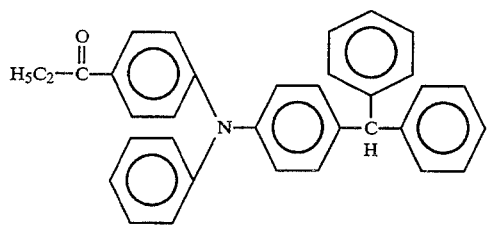
Comp. Ex. II-40
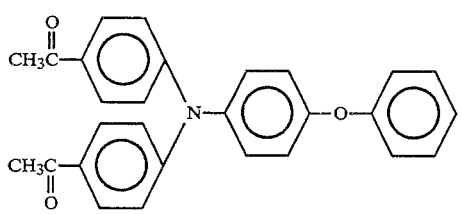
Comp. Ex. II-41
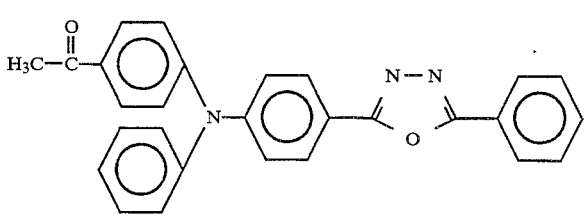
Comp. Ex. II-42
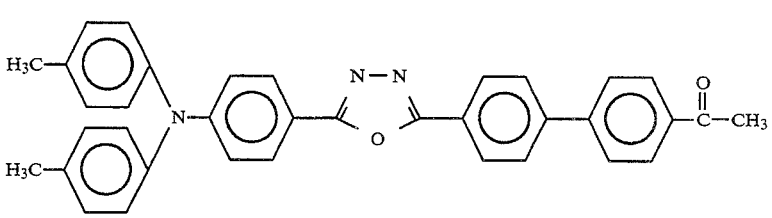
Comp. Ex. II-43
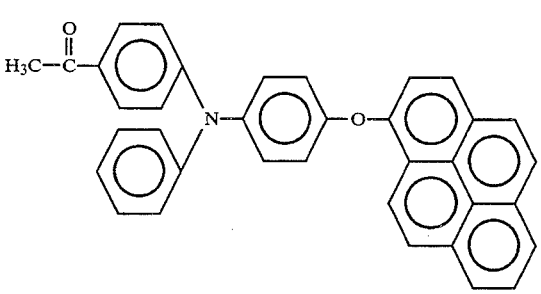
Comp. Ex. II-44
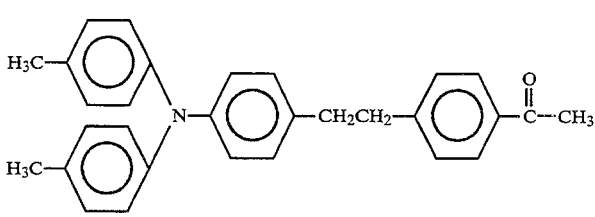
Comp. Ex. II-45

-continued
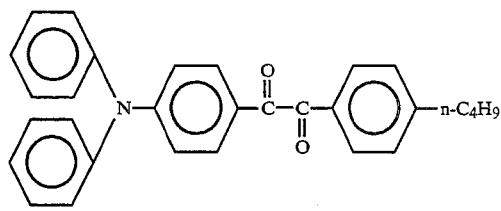
Comp. Ex. II-46
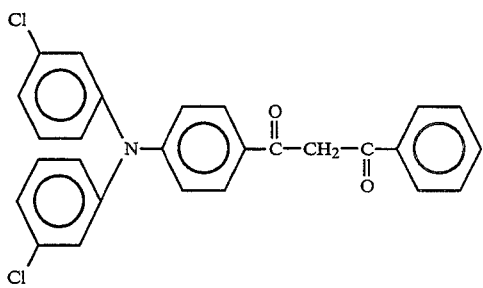
Comp. Ex. II-47
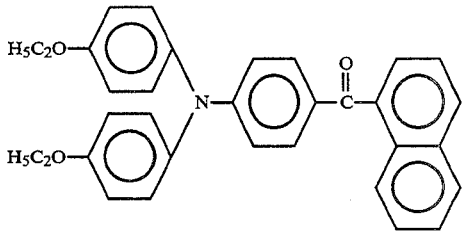
Comp. Ex. II-48
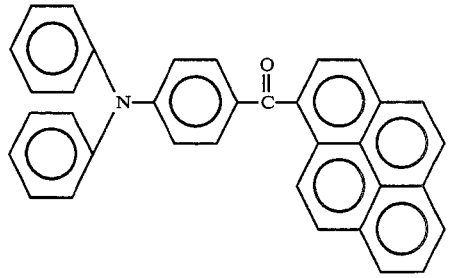
Comp. Ex. II-49
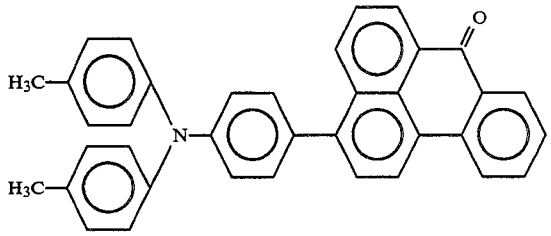
Comp. Ex. II-50
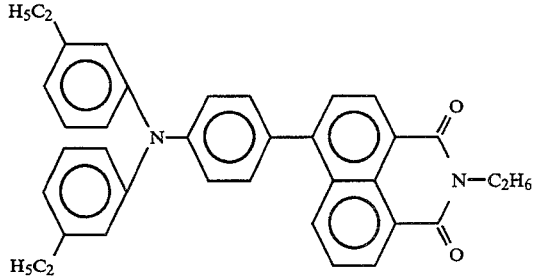
Comp. Ex. II-51

-continued

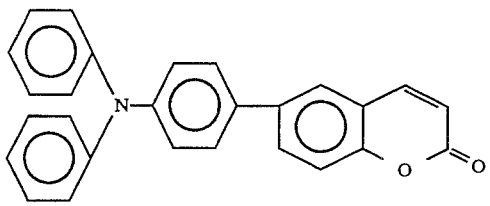

Comp. Ex. II-52

Methods for synthesis of the above-enumerated example compounds of the formula (I) and formula (II) are not unitary but one ordinarily skilled in organic synthesis can easily conceive of a synthesis method when a particular example compound is raised with its chemical structure as shown above. For example, the above-raised Comp. Ex. II, i.e.

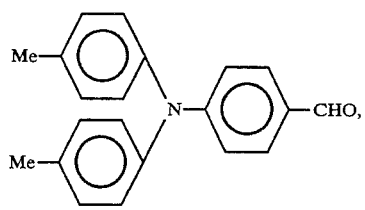

was synthesized in the following manner.

2.82 g (38.6 mmol) of N,N-dimethylformamide (DMF) was cooled to 0°–5° C. by iced water, and 1.63 g (10.6 mmol) of phosphorus oxychloride was gradually added dropwise thereto at 10° C. or below. After the addition, the content was further stirred for 15 min. under this condition, and 3.0 ml of a DMF solution containing 2.63 g (9.64 mmol) of 4,4'-dimethyltriphenylamine was gradually added dropwise thereto. After the addition, the content was restored to room temperature, stirred for 30 min., and then further stirred under heating at 60°–70° C. After cooling, the content was charged into about 100 ml of saturated acetic acid aqueous solution to cause hydrolysis, followed by extraction with toluene. The resultant organic layer was dried on anhydrous magnesium sulfate, then the solvent was removed, and the remainder was fractionated and purified by silica gel column chromatography to obtain 2.21 g of the objective product.

The organic compound layer 3 in the device may preferably have a thickness of at most 2.0 μm, further preferably at most 0.5 μm. On the other hand, the organic compound layer 3 may preferably have a thickness of at least 10 nm (0.01 μm) so as to provide a practically sufficient effect.

In the organic compound layer 3, the compound of the formula (I) may preferably be contained in a proportion of 20 wt. %–100 wt. %, further preferably 30 wt. %–100 wt. %. Two or more species of the compound of the formula (I) can be used in combination. The organic compound layer 3 can further contain another compound, such as a hole-transporting compound, an electron-transporting compound, a hole-transporting luminescent compound or an electron-transporting luminescent compound, in addition to the compound of the formula (I). Examples of such another compound are respectively enumerated hereinbelow.

Hole-transporting compound

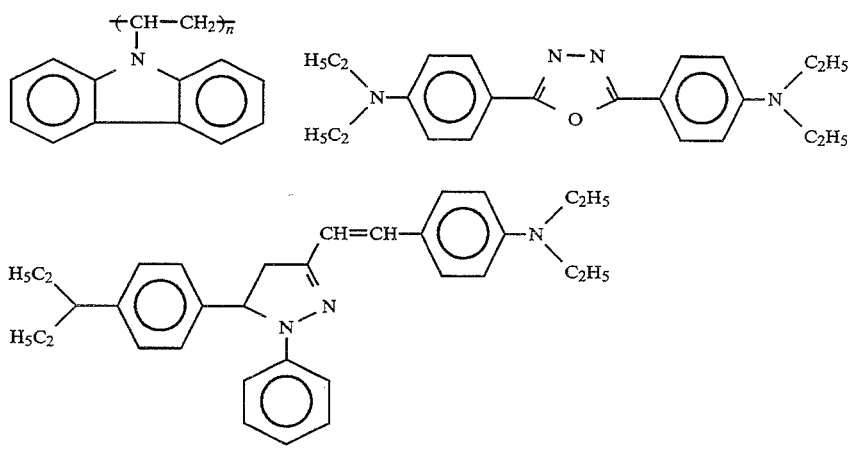

-continued
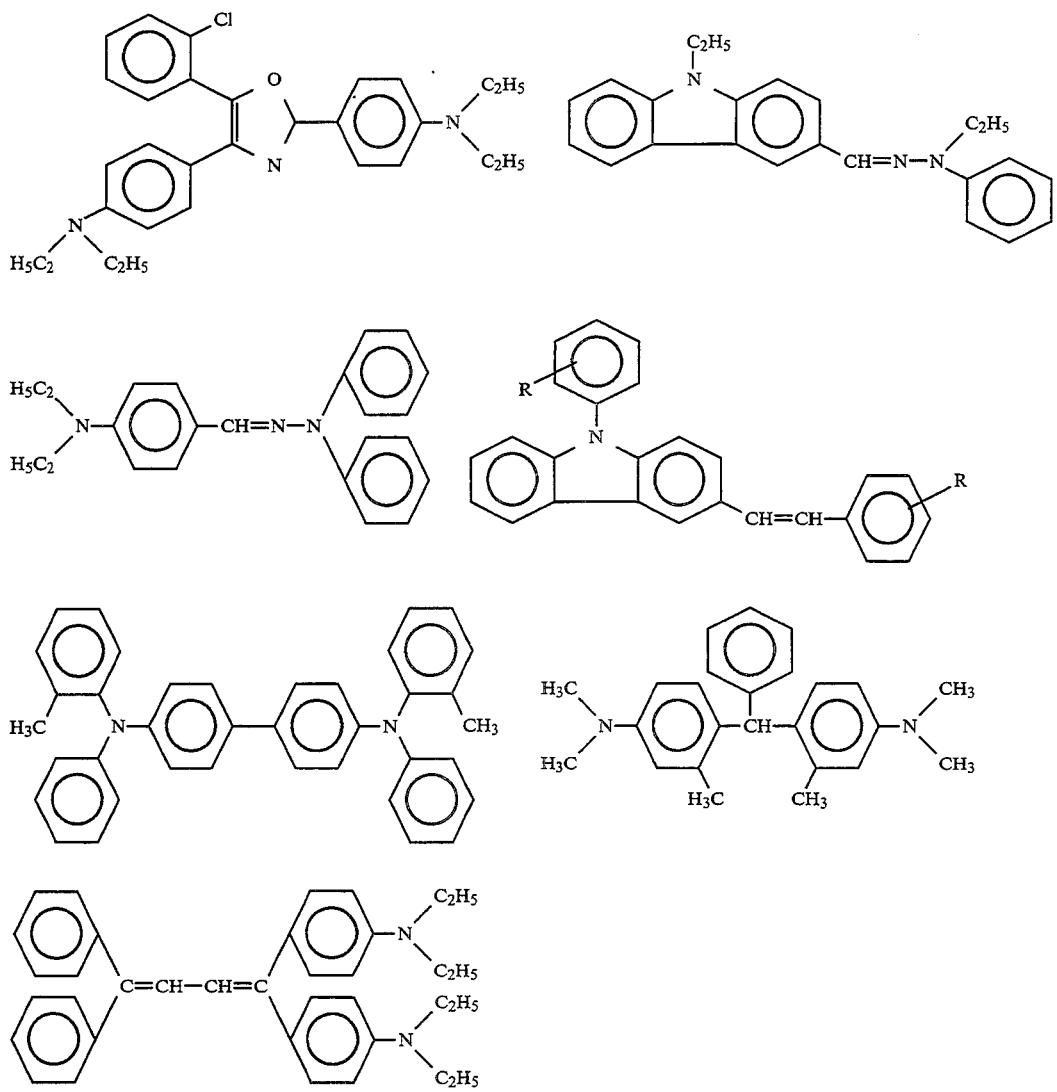
Hole-transporting luminescent compound
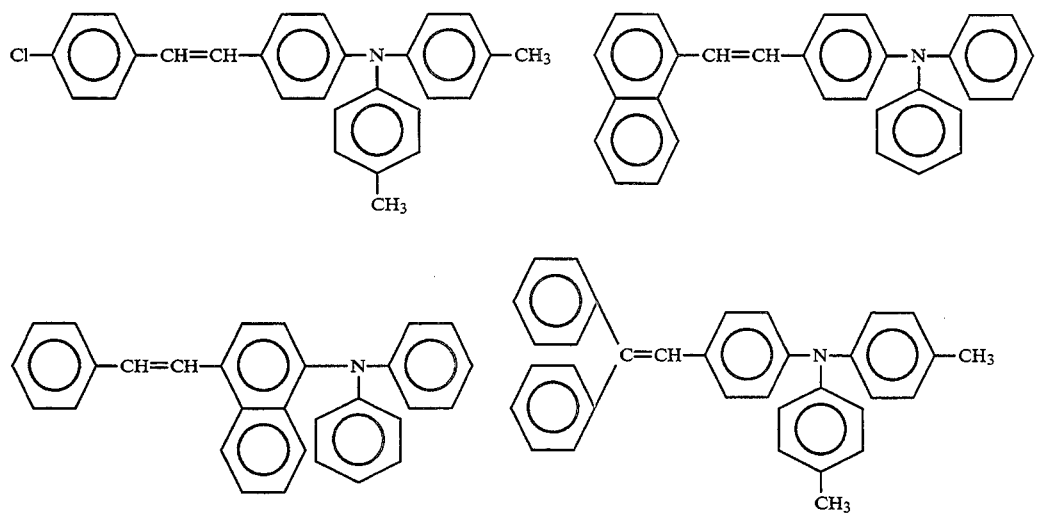
Electron-transporting compound

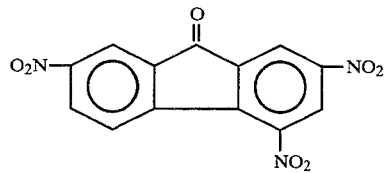
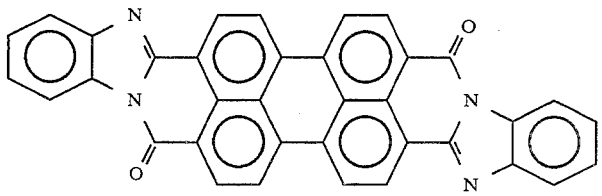
-continued
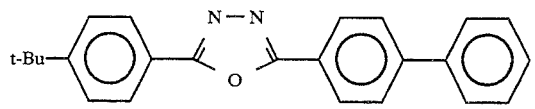
Electron-transporting luminescent compound
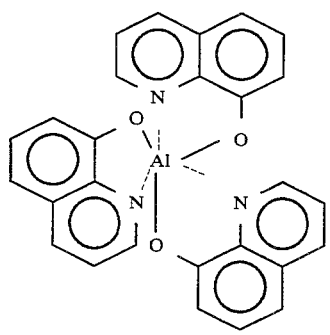
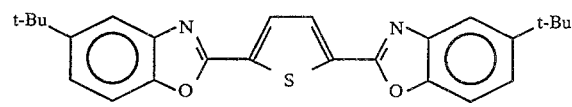
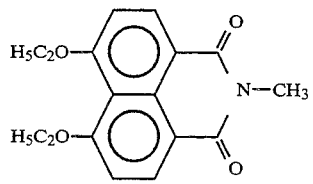
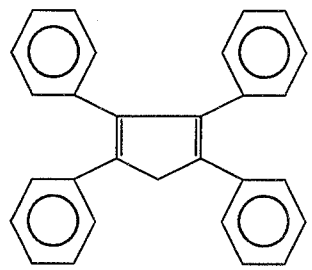
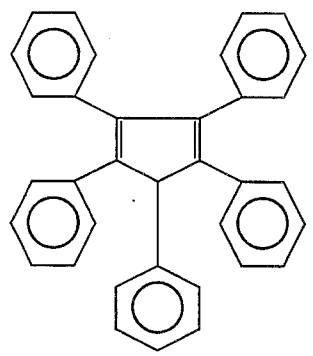
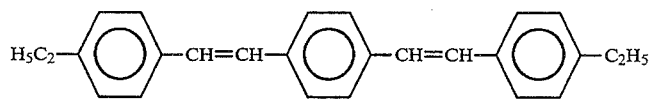
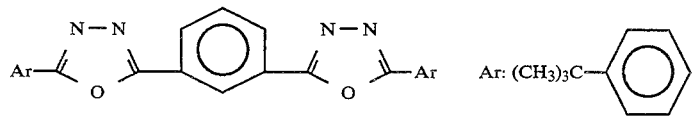
In the electroluminescent device according to the present invention, the organic compound layer 3 may have a multi-layer structure including a hole-transporting layer 3a and an electron-transporting layer 3b as shown in FIG. 2. In this case, the compound of the formula (I) may be included in either one or both of the hole-transporting layer 3a and the electron-transporting layer 3b depending on whether the compound of the formula (I) has either one or both of a hole-transporting property and an electron-transporting property. In case where the compound of the formula (I) is included in the hole-transporting layer 3a, the electron-transporting layer 3b may comprise an electron-transporting compound or an electron-transporting luminescent compound as described above. On the other hand, in case where the compound of the formula (I) is included in the electron-transporting layer 3b, the hole-transporting layer 3a may comprise a hole-transporting compound or a hole-transporting luminescent compound as described above.

Further, the organic compound layer 3 may have a multi-layer structure including a hole-transporting layer 3a, a luminescent layer 3c and an electron-transporting layer 3b as shown in FIG. 3. In this case, the compound of the formula (I) may be included in the luminescent layer 3c, and the hole-transporting layer 3a and the electron-transporting layer 3b may be composed similarly as explained with reference to FIG. 2.

If the organic compound layer 3 is formed in a multi-layer structure as shown in FIG. 2 or 3, the latitude of material selection is increased and it becomes possible to diversify the luminescent hue. Further, in the case of FIG. 3, it is possible to increase the luminous efficiency by effectively confining the holes and electrons (or excitons) into the central luminescent layer 3c.

In the case where the organic compound layer 3 is formed in a multi-layer structure as shown in FIG. 2 or 3, it is appropriate to form the respective layers in almost identical thicknesses.

Either one of the pair of electrodes 2 and 4 is constituted as an anode, which may preferably comprise a material having a work function as large as possible. Preferred examples of such a material may include nickel, gold, platinum, palladium, selenium, rhenium, iridium and alloys of these metals, tin oxide, indium-tin-oxide (ITO), and copper iodide. It is also possible to use an electroconductive polymer, such as poly(3-methylthiophene), polyphenylene sulfide or polypyrrole.

The other of the pair of electrodes 2 and 4 is constituted as a cathode, which may preferably comprise a material having a small work function, such as silver, lead, tin, magnesium, aluminum, calcium, manganese, indium, chromium or an alloy of these metals.

It is preferred that at least one of the electrodes 2 and 4 is constituted to have a transmittance of at least 50% in the luminescent wavelength region of the device.

The electron-transporting device according to the present invention may be prepared by forming such an organic compound layer 3 on the electrode 4 by vacuum deposition of the organic compound or film formation together with a binder resin.

The binder resin for the organic compound layer 3 may be selected from a wide range of materials, and examples thereof may include polyvinylcarbazole, polycarbonate, polyester, polyallylate, butyral resins polystyrene, polyvinyl acetal, diallkyl phthlate resin, acrylic resin, methacrylic resin, phenolic resin, epoxy resin, silicone resin, polysulfone, and urea resin. However, these are not exhaustive. Homopolymers or copolymers of these resins may be used alone or in mixture of two or more species.

The substrate 1 optionally used may preferably comprise transparent glass or plastic, for example.

As different from the conventional incandescent lamp, fluorescent lamp or luminescent diode, the electroluminescent device of the present invention is applicable to an electroluminescent (EL) panel which is a large-area, high-resolution, thin, light and completely solid device capable of high-speed drive and having a possibility of meeting with higher demands.

The electron-transporting device of the present invention can produce a luminance of very high luminance at a low application voltage and is also excellent in durability. Further, the device can be produced at a relatively low cost and in a large area by vacuum deposition or casting.

Hereinbelow, the electroluminescent device of the present invention will be described based on Examples, wherein the anode was generally disposed as the layer 2 (in FIGS. 1-3) closer to the substrate 1 with respect to the organic compound layer 3 but it is generally possible to dispose the anode on the side farther from the substrate 1 as is understood from the above description with reference to FIGS. 1-3.

EXAMPLE 1

An electroluminescent device of a structure as shown in FIG. 1 was prepared by successively forming a 95 nm-thick luminescent layer of Comp. Ex. 15 described before and a 160 nm-thick cathode of Mg/Ag (10/1) alloy, respectively by vacuum deposition, on an anode of 50 nm-thick indium-tin-oxide (ITO) film on a glass substrate.

The anode and cathode of the electroluminescent device thus produced were connected by a lead wire via a DC power supply, and a voltage of 10 volts was applied thereto, whereby a current flowed at a density of 8.0 $mA/cm^2$ and a luminescence was observed at an optical output of 0.08 $mW/cm^2$ as measured through the glass substrate.

Thereafter, the current density (8.0 $mA/cm^2$) was maintained for 48 hours, and a final output of 0.06 $mW/cm^2$ after the 48 hours was observed at a voltage of 12 volts.

EXAMPLES 2-4

Electroluminescent devices of Examples 2-4 were prepared in the same manner as in Example 1 except that Comp. Ex. 5, 26 and 42, respectively, were used instead of Comp. Ex. 15 in Example 1.

A current at a density of 8.0 $mA/cm^2$ was passed for 48 hours through the respective electroluminescent devices in the same manner as in Example 1. The results are summarized in Table 1 below.

TABLE 1

| | | Initial stage | | After 48 hours | |
|---|---|---|---|---|---|
| Ex. | Comp. Ex. | Applied voltage (V) | Optical output (mW/cm$^2$) | Applied voltage (V) | Optical output (mw/cm$^2$) |
| 2 | 5 | 11.0 | 0.10 | 12.3 | 0.07 |
| 3 | 26 | 9.0 | 0.08 | 10.5 | 0.04 |
| 4 | 42 | 10.1 | 0.12 | 13.4 | 0.07 |

CONTROL EXAMPLES 1-3

Electroluminescent devices of Control Examples 1-3 were prepared in the same manner as in Example 1 except that Control Comp. Ex. (Compound Examples)

1–3, respectively, of the structures shown below were used instead of Comp. Ex. 5 used in Example 2.

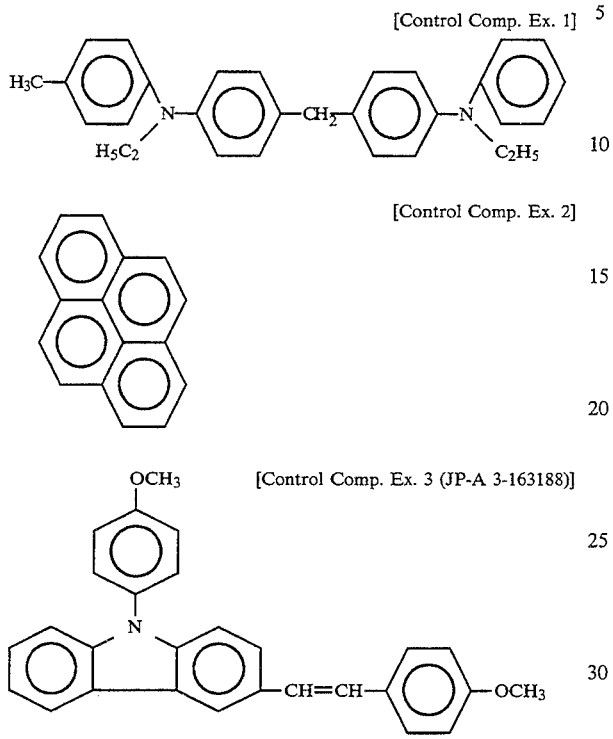

A current at a density of 8.0 mA/cm² was passed for 48 hours through the respective electroluminescent devices in the same manner as in Example 1.

The results are shown in the following Table 2.

TABLE 2

| Control Ex. | Control Comp. Ex. | Initial stage | | After 48 hours | |
|---|---|---|---|---|---|
| | | Applied voltage (V) | Optical output (mW/cm²) | Applied voltage (V) | Optical output (mw/cm²) |
| 1 | 1 | 14.1 | ** | — | — |
| 2 | 2 | 10.9 | 0.008 | 14.1 | 0.003 |
| 3 | 3 | 14.2 | 0.002 | 19.1 | ** |

**No optical output was observed.

As is clear from Tables 1 and 2 in comparison, the electroluminescent devices of the present invention showed much better optical output and durability than the electroluminescent devices of the Control Examples.

EXAMPLE 5

An electroluminescent device of a structure as shown in FIG. 2 was prepared by forming a 60 nm-thick luminescent layer of Comp. Ex. 32, a 40 nm-thick electron-transporting layer of Compound A of the following structure and a 150 nm-thick cathode of Mg/Ag (10/1) alloy, respectively by vacuum deposition, on a 50 nm-thick ITO anode on a glass substrate.

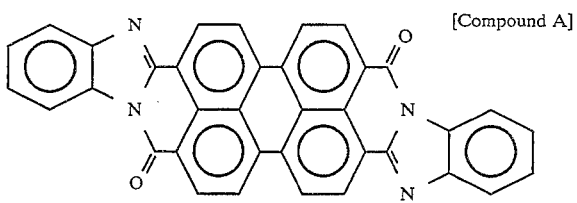

The anode and cathode of the electroluminescent device thus prepared were connected by a lead wire via a DC power supply, and a voltage of 6.0 volts was applied thereto, whereby a current flowed at a density of 9.0 mA/cm² and a luminescence was observed at an optical output of 0.2 mW/cm². Thereafter, the same current density (9.0 mA/cm²) was maintained for 100 hours, and a final output of 0.18 mW/cm² was observed even after 80 hours at an applied voltage of 7.9 volts.

EXAMPLES 6–9

Electroluminescent devices of Examples 6–9 were prepared in the same manner as in Example 5 except that Comp. Ex. 4, 21, 33 and 40, respectively, were used instead of Comp. Ex. 32 in Example 5.

A current at a density of 9.0 mA/cm² was passed through the respective electron-transporting devices in the same manner as in Example 5. The results are summarized in Table 3 below.

TABLE 3

| Example | Comp. Ex. | Applied voltage (V) | Optical output (mW/cm²) |
|---|---|---|---|
| 6 | 4 | 6.3 | 0.10 |
| 7 | 21 | 7.1 | 0.16 |
| 8 | 33 | 7.2 | 0.09 |
| 9 | 40 | 5.8 | 0.11 |

CONTROL EXAMPLES 4–7

Electroluminescent devices of Control Examples 4–7 were prepared in the same manner as in Example 6 except that Control Comp. Ex. 4–7, respectively, of the structures shown below were used instead of Comp. Ex. 4 used in Example 6.

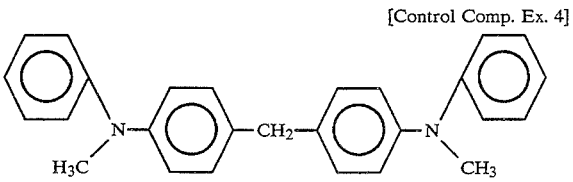

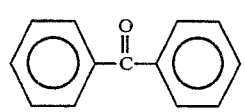

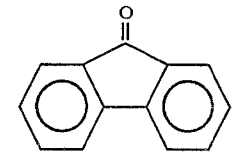

-continued

[Control Comp. Ex. 7]

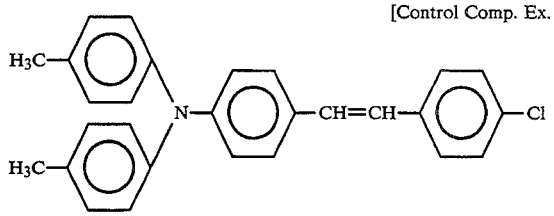

A current at a density of 9.0 mA/cm² was passed through the respective electroluminescent devices in the same manner as in Example 5. The results are shown in Table 4 below.

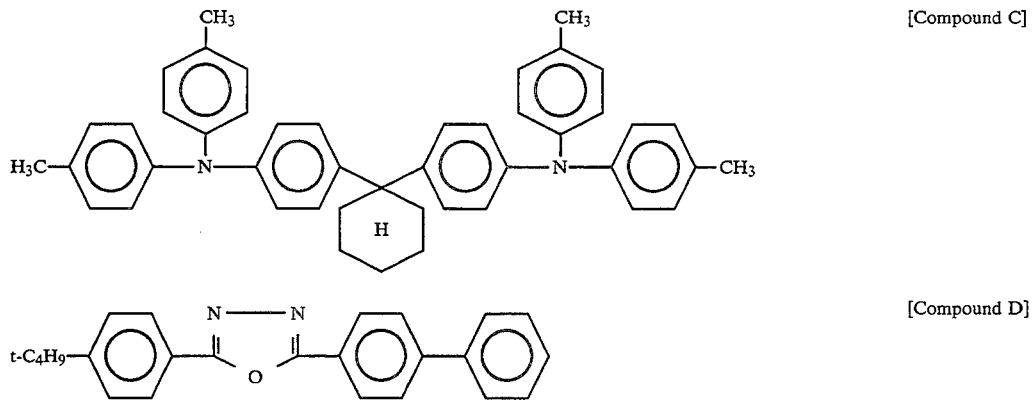

[Compound C]

[Compound D]

TABLE 4

| Control Example | Control Comp. Ex. | Applied voltage (V) | Optical output (mW/cm²) |
|---|---|---|---|
| 4 | 4 | 20.1 | ** |
| 5 | 5 | 27.4 | ** |
| 6 | 6 | 28.9 | ** |
| 7 | 7 | 16.8 | 0.007 |

**No optical output was observed.

As is clear from Tables 3 and 4 in comparison, the electroluminescent devices of the present invention showed much better optical output in comparison with the electroluminescent devices of the control Examples.

EXAMPLE 10

An electroluminescent device of a structure as shown in FIG. 2 was prepared by successively forming a 60 nm-thick anode of gold, a 40 nm-thick hole-transporting layer of Compound B of the following formula, a 65 nm-thick luminescent layer of Comp. Ex. 28 and a 120 nm-thick cathode of aluminum, respectively by vacuum deposition, on a glass substrate.

[Compound B]

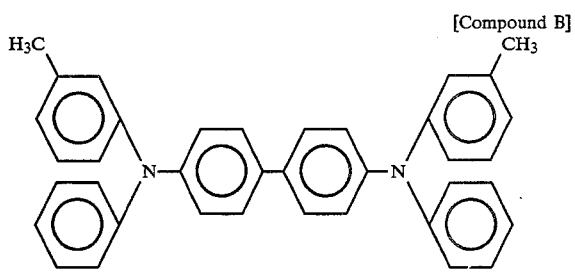

The anode and cathode of the electroluminescent device thus prepared were connected by a lead wire via a DC power supply, and a voltage of 8.0 volts was applied thereto, whereby a current flowed at a density of 9.5 mA/cm² and a luminescence at an optical output of 0.10 mW/cm² was observed.

EXAMPLE 11

An electroluminescent device of a structure as shown in FIG. 3 was prepared by successively forming a 40 nm-thick hole-transporting layer of Compound C of the formula shown below, a 60 nm-thick luminescent layer of Comp. Ex. 16, a 40 nm-thick electron-transporting layer of Compound D shown below and a 120 nm-thick cathode of Mg/Ag (10/1) alloy, respectively by vacuum deposition, on a 60 nm-thick ITO anode on a glass substrate.

The anode and cathode of the electroluminescent device thus prepared were connected by a lead wire via a DC power supply, and a voltage of 7.0 volts was applied thereto, whereby a current flowed at a density of 11.0 mA/cm², and a luminescence at an optical output of 0.20 mW/cm² was observed.

EXAMPLES 12-16

Electroluminescent devices of Examples 12-16 were prepared in the same manner as in Example 11 except that Comp. Ex. 4, 6, 14, 49 and 56, respectively, were used instead of Comp. Ex. 16 used in Example 11.

A current at a density of 11.0 mA/cm² was passed through the respective devices. The results are shown in Table 5 below.

TABLE 5

| Example | Comp. Ex. | Applied voltage (V) | Optical output (mW/cm²) |
|---|---|---|---|
| 12 | 4 | 7.2 | 0.07 |
| 13 | 6 | 8.4 | 0.10 |
| 14 | 14 | 6.8 | 0.21 |
| 15 | 49 | 7.1 | 0.19 |
| 16 | 56 | 8.9 | 0.20 |

CONTROL EXAMPLES 8-12

Electroluminescent devices of Control Examples 8-12 were prepared in the same manner as in Example 11 except that Control Comp. Ex. 8-12, respectively, of the structures shown below were used instead of Comp. Ex. 16 used in Example 11.

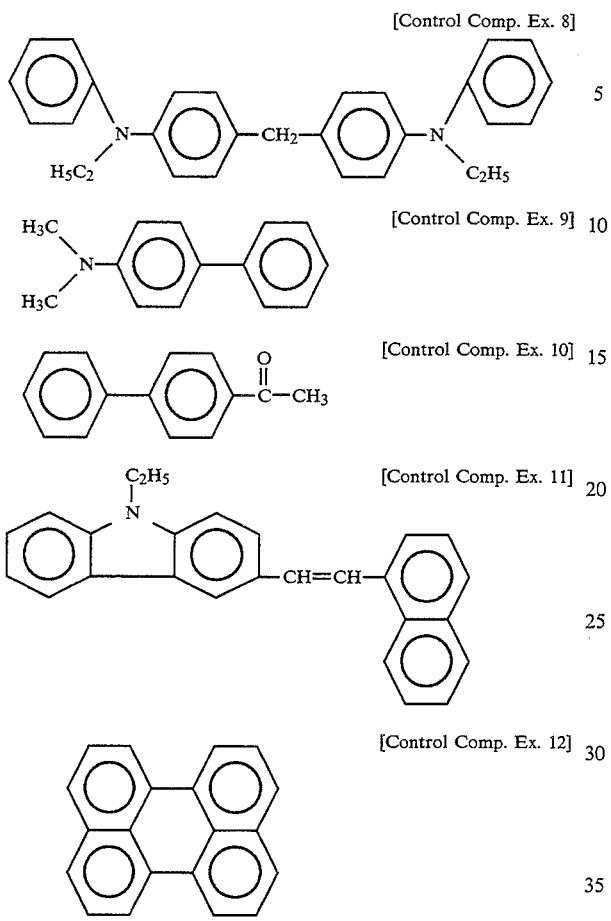

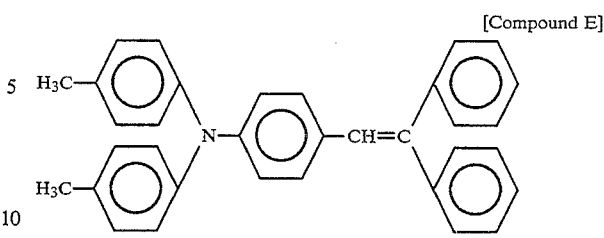

The anode and cathode of the electroluminescent device thus prepared were connected by a lead wire via a DC power supply, and a voltage of 12.0 volts was applied thereto, whereby a current flowed at a density of 4.8 mA/cm$^2$, and a luminescence at an optical output of 0.01 mW/cm$^2$ was observed.

EXAMPLE 18

An electroluminescent device of a structure as shown in FIG. 1 was prepared by successively forming a 100 nm-thick luminescent layer of Comp. Ex. 61 and a 200 nm-thick cathode of Mg/Ag (10/1) alloy, respectively by vacuum deposition, on an anode of 50 nm-thick indium-tin-oxide (ITO) film on a glass substrate.

The anode and cathode of the electroluminescent device thus produced were connected by a lead wire via a DC power supply, and a voltage of 8 volts was applied thereto, whereby a current flowed at a density of 9.0 mA/cm$^2$, and a luminescence was observed at an optical output of 0.11 mW/cm$^2$.

Thereafter, the current density (9.0 mA/cm$^2$) was maintained for 48 hours, and a final output of 0.09 mW/cm$^2$ after the 48 hours was observed at a voltage of 9.5 volts.

EXAMPLES 19–22

Electroluminescent devices of Examples 19–22 were prepared in the same manner as in Example 18 except that Comp. Ex. 74, 79, 102 and 115, respectively, were used instead of Comp. Ex. 61 in Example 18.

A current at a density of 9.0 mA/cm$^2$ was passed for 48 hours through the respective electroluminescent devices in the same manner as in Example 18. The results are summarized in Table 7 below.

A current at a density of 11.0 mA/cm$^2$ was passed through the respective electroluminescent devices in the same manner as in Example 11. The results are shown in Table 6 below.

TABLE 6

| Control Example | Control Comp. Ex. | Applied voltage (V) | Optical output (mW/cm$^2$) |
| --- | --- | --- | --- |
| 8 | 8 | 24.1 | ** |
| 9 | 9 | 28.2 | ** |
| 10 | 10 | 19.1 | ** |
| 11 | 11 | 18.6 | 0.002 |
| 12 | 12 | 16.4 | 0.004 |

**No optical output was observed.

As is clear from Tables 5 and 6 in comparison, the electroluminescent devices of the present invention showed much better optical output in comparison with the electroluminescent devices of the control Examples.

EXAMPLE 17

2 g of Comp. Ex. 15, 1 g of a hole-transporting Compound E of the formula below, 1 g of the above-mentioned electron-transporting Compound D and 3 g of polycarbonate (Mw (weight-average molecular weight)=35,000) were dissolved in 250 ml of tetrahydrofuran to form a coating liquid. The coating liquid was then applied by a wire bar on a 50 nm-thick ITO cathode film on a glass substrate to form a 300 nm-thick layer, on which was further formed a 180 nm-thick aluminum cathode by vacuum deposition to prepare an electroluminescent device.

TABLE 7

| | | Initial stage | | After 48 hours | |
| --- | --- | --- | --- | --- | --- |
| Ex. | Comp. Ex. | Applied voltage (V) | Optical output (mW/cm$^2$) | Applied voltage (V) | Optical output (mw/cm$^2$) |
| 19 | 74 | 10.2 | 0.12 | 12.3 | 0.10 |
| 20 | 79 | 9.1 | 0.19 | 10.5 | 0.16 |
| 21 | 102 | 9.2 | 0.20 | 10.1 | 0.17 |
| 22 | 115 | 7.2 | 0.29 | 8.1 | 0.27 |

CONTROL EXAMPLES 13–16

Electroluminescent devices of Control Examples 13–16 were prepared in the same manner as in Example 8 except that Control Comp. Ex. 13–16, respectively, of the structures shown below were used instead of Comp. Ex. 61 used in Example 18.

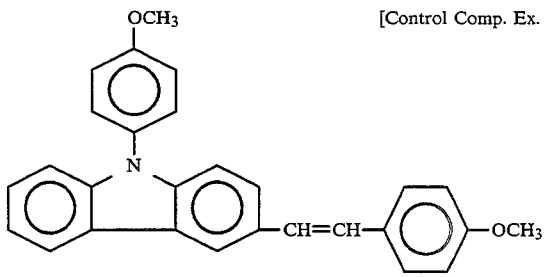

[Control Comp. Ex. 13]

[Control Comp. Ex. 14]

[Control Comp. Ex. 15]

[Control Comp. Ex. 16]

A current at a density of 9.0 mA/cm² was passed for 48 hours through the respective electroluminescent devices in the same manner as in Example 18.

The results are shown in the following Table 8.

TABLE 8

| Control Ex. | Control Comp. Ex. | Initial stage | | After 48 hours | |
|---|---|---|---|---|---|
| | | Applied voltage (V) | Optical output (mW/cm²) | Applied voltage (V) | Optical output (mw/cm²) |
| 13 | 13 | 14.1 | 0.001 | 20.1 | ** |
| 14 | 14 | 15.1 | ** | — | — |
| 15 | 15 | 13.1 | 0.007 | 18.1 | 0.003 |
| 16 | 16 | 16.1 | 0.002 | 19.3 | ** |

**No optical output was observed.

As is clear from Tables 7 and 8 in comparison, the electroluminescent devices of the present invention showed much better optical output and durability than the electroluminescent devices of the Control Examples.

EXAMPLE 23

An electroluminescent device of a structure as shown in FIG. 2 was prepared by forming a 55 nm-thick luminescent layer of Comp. Ex. 77, a 40 nm-thick electron-transporting layer of the above-mentioned Compound A and a 140 nm-thick cathode of Mg/Ag (10/1) alloy, respectively by vacuum deposition, on a 50 nm-thick ITO anode on a glass substrate.

The anode and cathode of the electroluminescent device thus prepared were connected by a lead wire via a DC power supply, and a voltage of 8.0 volts was applied thereto, whereby a current flowed at a density of 9.1 mA/cm² and a luminescence was observed at an optical output of 0.21 mW/cm². Thereafter, the same current density (9.5 mA/cm²) was maintained for 48 hours, and a final output of 0.18 mW/cm² was observed even after 48 hours at an applied voltage of 8.2 volts.

EXAMPLES 24-26

Electroluminescent devices of Examples 24–26 were prepared in the same manner as in Example 23 except that Comp. Ex. 62, 91 and 104, respectively, were used instead of Comp. Ex. 77 used in Example 23.

A current at a density of 9.5 mA/cm² was passed through the respective devices. The results are shown in Table 9 below.

TABLE 9

| Example | Comp. Ex. | Applied voltage (V) | Optical output (mW/cm²) |
|---|---|---|---|
| 24 | 62 | 9.0 | 0.19 |
| 25 | 91 | 9.3 | 0.27 |
| 26 | 104 | 8.9 | 0.26 |

CONTROL EXAMPLES 17-19

Electroluminescent devices of Control Examples 17–19 were prepared in the same manner as in Example 24 except that Control Comp. Ex. 17-19, respectively, of the structures shown below were used instead of Comp. Ex. 62 used in Example 24.

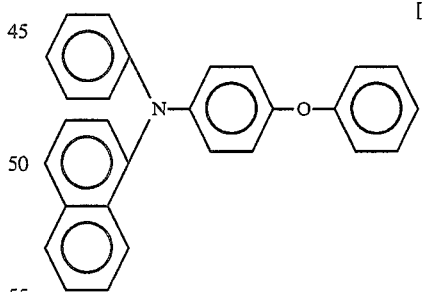

[Control Comp. Ex. 17]

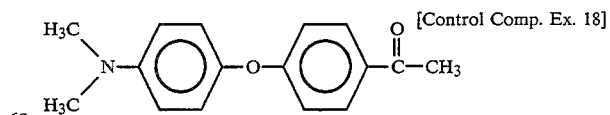

[Control Comp. Ex. 18]

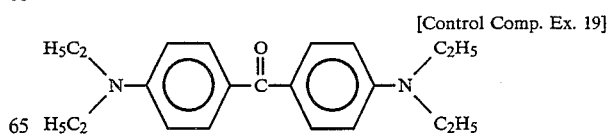

[Control Comp. Ex. 19]

A current at a density of 9.5 mA/cm² was passed through the respective electroluminescent devices in the same manner as in Example 24. The results are shown in Table 10 below.

TABLE 10

| Control Example | Control Comp. Ex. | Applied voltage (V) | Optical output (mW/cm$^2$) |
|---|---|---|---|
| 17 | 17 | 16.1 | 0.002 |
| 18 | 18 | 25.1 | ** |
| 19 | 19 | 18.7 | ** |

**No optical output was observed.

As is clear from Tables 9 and 10 in comparison, the electroluminescent devices of the present invention showed much better optical output in comparison with the electroluminescent devices of the control Examples.

EXAMPLE 27

An electroluminescent device of a structure as shown in FIG. 2 was prepared by successively forming a 60 nm-thick anode of gold, a 50 nm-thick hole-transporting layer of the above-mentioned Compound E of the following formula, a 60 nm-thick luminescent layer of Comp. Ex. 82 and a 150 nm-thick cathode of aluminum, respectively by vacuum deposition, on a glass substrate.

The anode and cathode of the electroluminescent device thus prepared were connected by a lead wire via a DC power supply, and a voltage of 8.0 volts was applied thereto, whereby a current flowed at a density of 7.5 mA/cm$^2$, and a luminescence at an optical output of 0.12 mW/cm$^2$ was observed.

EXAMPLE 28

An electroluminescent device of a structure as shown in FIG. 3 was prepared by successively forming a 50 nm-thick hole-transporting layer of the above-mentioned Compound C, a 50 nm-thick luminescent layer of Comp. Ex. 67, a 45 nm-thick electron-transporting layer of the above-mentioned Compound D and a 150 nm-thick cathode of Mg/Ag (10/1) alloy, respectively by vacuum deposition, on a 60 nm-thick ITO anode on a glass substrate.

The anode and cathode of the electroluminescent device thus prepared were connected by a lead wire via a DC power supply, and a voltage of 6.5 volts was applied thereto, whereby a current flowed at a density of 10.2 mA/cm$^2$, and a luminescence at an optical output of 0.16 mW/cm$^2$ was observed.

EXAMPLES 29–33

Electroluminescent devices of Examples 29–33 were prepared in the same manner as in Example 28 except that Comp. Ex. 73, 90, 101, 112 and 114, respectively, were used instead of Comp. Ex. 67 used in Example 28.

A current at a density of 8.0 mA/cm$^2$ was passed through the respective devices. The results are shown in Table 11 below.

TABLE 11

| Example | Comp. Ex. | Applied voltage (V) | Optical output (mW/cm$^2$) |
|---|---|---|---|
| 29 | 73 | 6.0 | 0.26 |
| 30 | 90 | 7.2 | 0.10 |
| 31 | 101 | 6.9 | 0.12 |
| 32 | 112 | 8.1 | 0.17 |
| 33 | 114 | 7.2 | 0.19 |

CONTROL EXAMPLES 20–24

Electroluminescent devices of Control Examples 20–24 were prepared in the same manner as in Example 29 except that Control Comp. Ex. 20–24, respectively, of the structures shown below were used instead of Comp. Ex. 73 used in Example 29.

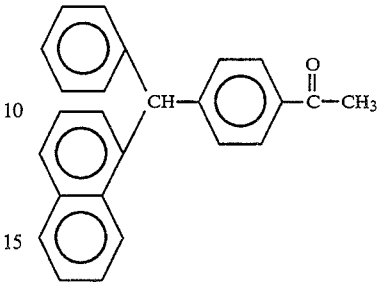

[Control Comp. Ex. 20]

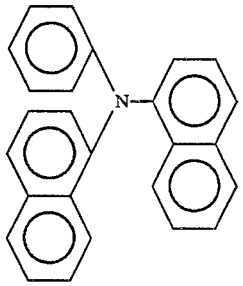

[Control Comp. Ex. 21]

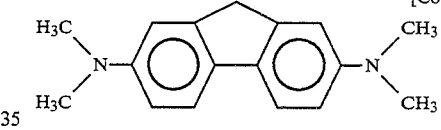

[Control Comp. Ex. 22]

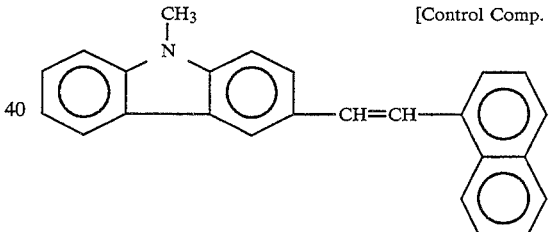

[Control Comp. Ex. 23]

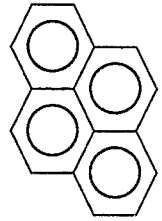

[Control Comp. Ex. 24]

A current at a density of 8.0 mA/cm$^2$ was passed through the respective electroluminescent devices in the same manner as in Example 29. The results are shown in Table 12 below.

TABLE 12

| Control Example | Control Comp. Ex. | Applied voltage (V) | Optical output (mW/cm$^2$) |
|---|---|---|---|
| 20 | 20 | 21 | ** |
| 21 | 21 | 14 | 0.003 |
| 22 | 22 | 28 | ** |
| 23 | 23 | 17 | 0.002 |

TABLE 12-continued

| Control Example | Control Comp. Ex. | Applied voltage (V) | Optical output (mW/cm$^2$) |
|---|---|---|---|
| 24 | 24 | 12 | 0.002 |

**No optical output was observed.

As is clear from Tables 11 and 12 in comparison, the electroluminescent devices of the present invention showed much better optical output in comparison with the electroluminescent devices of the control Examples.

EXAMPLE 34

2 g of Comp. Ex. 76, 1 g of a hole-transporting Compound F of the formula below, 1.5 g of the above-mentioned electron-transporting Compound D and 2 g of polycarbonate (Mw=35,000) were dissolved in 300 ml of tetrahydrofuran to form a coating liquid. The coating liquid was then applied by a wire bar on a 50 nm-thick ITO cathode film on a glass substrate to form a 280 nm-thick layer, on which was further formed a 150 nm-thick aluminum cathode by vacuum deposition to prepare an electroluminescent device.

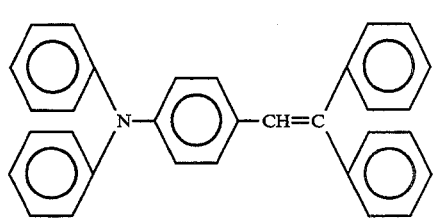

[Compound F]

The anode and cathode of the electroluminescent device thus prepared were connected by a lead wire via a DC power supply, and a voltage of 10.0 volts was applied thereto, whereby a current flowed at a density of 4.9 mA/cm$^2$, and a luminescence at an optical output of 0.09 mW/cm$^2$ was observed.

EXAMPLE 35

An electroluminescent device of a structure as shown in FIG. 1 was prepared by successively forming a 110 nm-thick luminescent layer of Comp. Ex. II-3 described before and a 150 nm-thick cathode of Mg/Ag (10/1) alloy, respectively by vacuum deposition, on an anode of 50 nm-thick indium-tin-oxide (ITO) film on a glass substrate.

The anode and cathode of the electroluminescent device thus produced were connected by a lead wire via a DC power supply, and a voltage of 6.0 volts was applied thereto, whereby a current flowed at a density of 7.0 mA/cm$^2$, and a luminescence was observed at an optical output of 0.15 mW/cm$^2$.

Thereafter, the current density (7.0 mA/cm$^2$) was maintained for 48 hours, and a final output of 0.12 mW/cm$^2$ after the 48 hours was observed at a voltage of 7.1 volts.

EXAMPLES 36–40

Electroluminescent devices of Examples 36–40 were prepared in the same manner as in Example 35 except that Comp. Ex. II-5, II-9, II-14, II-31 and II-49, respectively, were used instead of Comp. Ex. II-3 in Example 35.

A current at a density of 7.0 mA/cm$^2$ was passed for 48 hours through the respective electroluminescent devices in the same manner as in Example 35. The results are summarized in Table 13 below.

TABLE 13

| Ex. | Comp. Ex. | Initial stage | | After 48 hours | |
|---|---|---|---|---|---|
| | | Applied voltage (V) | Optical output (mW/cm$^2$) | Applied voltage (V) | Optical output (mw/cm$^2$) |
| 36 | II-5 | 6.1 | 0.16 | 6.9 | 0.13 |
| 37 | II-9 | 6.6 | 0.30 | 6.9 | 0.27 |
| 38 | II-14 | 7.1 | 0.14 | 7.8 | 0.12 |
| 39 | II-31 | 7.1 | 0.13 | 7.7 | 0.10 |
| 40 | II-49 | 5.9 | 0.35 | 6.2 | 0.33 |

CONTROL EXAMPLES 25–29

Electroluminescent devices of Control Examples 25–29 were prepared in the same manner as in Example 1 except that Control Comp. Ex. II-1 to II-5, respectively, of the structures shown below were used instead of Comp. Ex. II-3 used in Example 35.

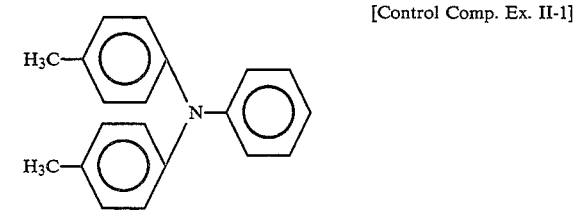

[Control Comp. Ex. II-1]

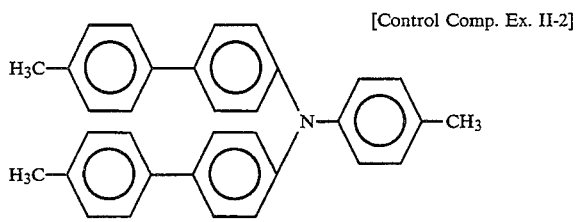

[Control Comp. Ex. II-2]

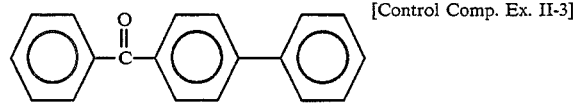

[Control Comp. Ex. II-3]

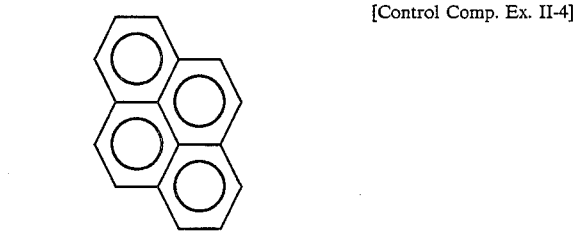

[Control Comp. Ex. II-4]

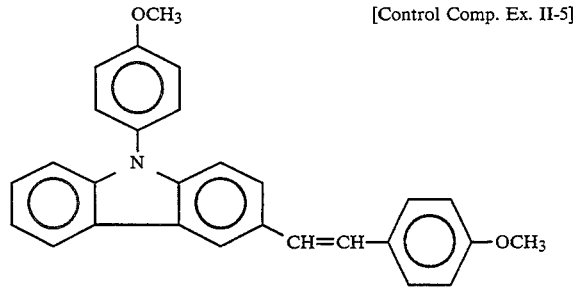

[Control Comp. Ex. II-5]

A current at a density of 7.0 mA/cm² was passed for 48 hours through the respective electroluminescent devices in the same manner as in Example 35.

The results are shown in the following Table 14.

TABLE 14

| Control Ex. | Control Comp. Ex. | Initial stage | | After 48 hours | |
|---|---|---|---|---|---|
| | | Applied voltage (V) | Optical output (mW/cm²) | Applied voltage (V) | Optical output (mw/cm²) |
| 25 | II-1 | 12.3 | ** | — | — |
| 26 | II-2 | 12.1 | 0.001 | 18.0 | ** |
| 27 | II-3 | 18.1 | ** | — | — |
| 28 | II-4 | 10.1 | 0.002 | 16.4 | ** |
| 29 | II-5 | 13.6 | 0.001 | 19.1 | ** |

**No optical output was observed.

As is clear from Tables 13 and 14 in comparison, the electroluminescent devices of the present invention showed much better optical output and durability than the electroluminescent devices of the Control Examples.

EXAMPLE 41

An electroluminescent device of a structure as shown in FIG. 2 was prepared by forming a 60 nm-thick luminescent layer of Comp. Ex. II-13, a 40 nm-thick electron-transporting layer of Compound G of the following structure and a 200 nm-thick cathode of Mg/Ag (10/1) alloy, respectively by vacuum deposition, on a 60 nm-thick ITO anode on a glass substrate.

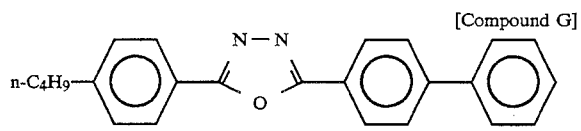

[Compound G]

The anode and cathode of the electroluminescent device thus prepared were connected by a lead wire via a DC power supply, and a voltage of 7.5 volts was applied thereto, whereby a current flowed at a density of 8.8 mA/cm² and a luminescence was observed at an optical output of 0.26 mW/cm². Thereafter, the same current density (8.8 mA/cm²) was maintained for 48 hours, and a final output of 0.24 mW/cm² was observed after 48 hours at an applied voltage of 7.8 volts.

EXAMPLES 42-44

Electroluminescent devices of Examples 42-44 were prepared in the same manner as in Example 41 except that Comp. Ex. II-18, II-21 and II-25, respectively, were used instead of Comp. Ex. II-13 used in Example 41.

A current at a density of 8.8 mA/cm² was passed through the respective devices. The results are shown in Table 15 below.

TABLE 15

| Example | Comp. Ex. | Applied voltage (V) | Optical output (mW/cm²) |
|---|---|---|---|
| 42 | II-18 | 8.1 | 0.19 |
| 43 | II-21 | 7.9 | 0.22 |
| 44 | II-25 | 6.9 | 0.18 |

CONTROL EXAMPLES 30 AND 31

Electroluminescent devices of Control Examples 30 and 31 were prepared in the same manner as in Example 42 except that Control Comp. Ex. II-6 and II-7, respectively, of the structures shown below were used instead of Comp. Ex. II-18 used in Example 42.

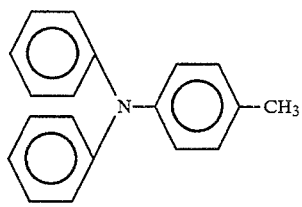

[Control Comp. Ex. II-6]

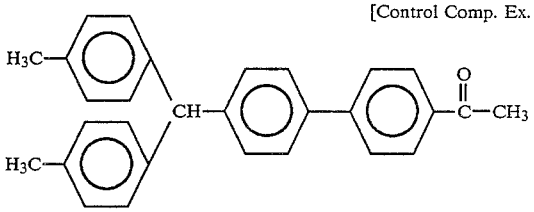

[Control Comp. Ex. II-7]

A current at a density of 8.8 mA/cm² was passed through the respective electroluminescent devices in the same manner as in Example 42. The results are shown in Table 16 below.

TABLE 16

| Control Example | Control Comp. Ex. | Applied voltage (V) | Optical output (mW/cm²) |
|---|---|---|---|
| 30 | II-6 | 17.2 | ** |
| 31 | II-7 | 14.9 | 0.001 |

**No optical output was observed.

As is clear from Tables 15 and 16 in comparison, the electroluminescent devices of the present invention showed much better optical output in comparison with the electroluminescent devices of the control Examples.

EXAMPLE 45

An electroluminescent device of a structure as shown in FIG. 2 was prepared by successively forming a 50 nm-thick anode of gold, a 50 nm-thick hole-transporting layer of the above-mentioned Compound F, a 50 nm-thick luminescent layer of Comp. Ex. II-50 and a 200 nm-thick cathode of aluminum, respectively by vacuum deposition, on a glass substrate.

The anode and cathode of the electroluminescent device thus prepared were connected by a lead wire via a DC power supply, and a voltage of 10.0 volts was applied thereto, whereby a current flowed at a density of 10.4 mA/cm², and a luminescence at an optical output of 0.18 mW/cm² was observed.

EXAMPLE 46

An electroluminescent device of a structure as shown in FIG. 3 was prepared by successively forming a 60 nm-thick hole-transporting layer of Compound H of the formula shown below, a 70 nm-thick luminescent layer of Comp. Ex. II-51, a 60 nm-thick electron-transporting layer of the above-mentioned Compound D and a 150 nm-thick cathode of Mg/Ag (10/1) alloy, respectively by vacuum deposition, on a 50 nm-thick ITO anode on a glass substrate.

[Compound H]

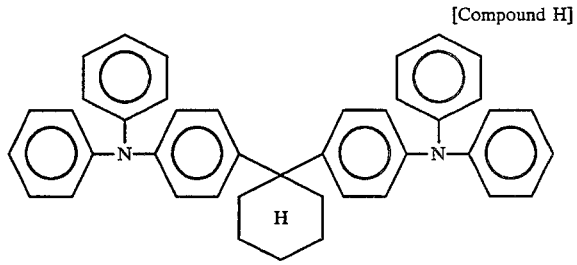

The anode and cathode of the electroluminescent device thus prepared were connected by a lead wire via a DC power supply, and a voltage of 6.2 volts was applied thereto, whereby a current flowed at a density of 7.0 mA/cm$^2$ and a luminescence at an optical output of 0.24 mW/cm$^2$ was observed.

EXAMPLES 47–51

Electroluminescent devices of Examples 47–51 were prepared in the same manner as in Example 46 except that Comp. Ex. II-10, II-12, II-26, II-44 and II-48, respectively, were used instead of Comp. Ex. II-51 used in Example 46.

A current at a density of 7.0 mA/cm$^2$ was passed through the respective devices. The results are shown in Table 17 below.

TABLE 17

| Example | Comp. Ex. | Applied voltage (V) | Optical output (mW/cm$^2$) |
|---|---|---|---|
| 47 | II-10 | 7.1 | 0.21 |
| 48 | II-12 | 8.0 | 0.26 |
| 49 | II-26 | 6.9 | 0.39 |
| 50 | II-44 | 5.9 | 0.34 |
| 51 | II-48 | 6.9 | 0.35 |

CONTROL EXAMPLES 32–36

Electroluminescent devices of Control Examples 32–36 were prepared in the same manner as in Example 47 except that Control Comp. Ex. II-8 to II-12, respectively, of the structures shown below were used instead of Comp. Ex. II-10 used in Example 47.

[Control Comp. Ex. II-8]

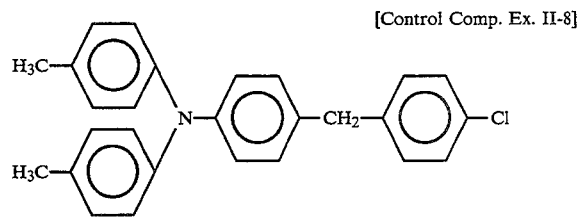

[Control Comp. Ex. II-9]

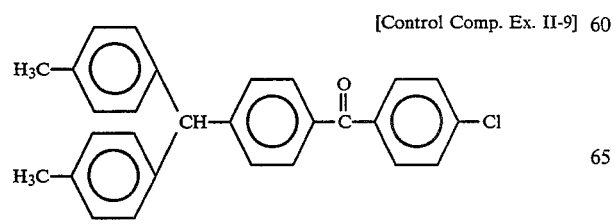

[Control Comp. Ex. II-10]
[Control Comp. Ex. II-11]
[Control Comp. Ex. II-12]

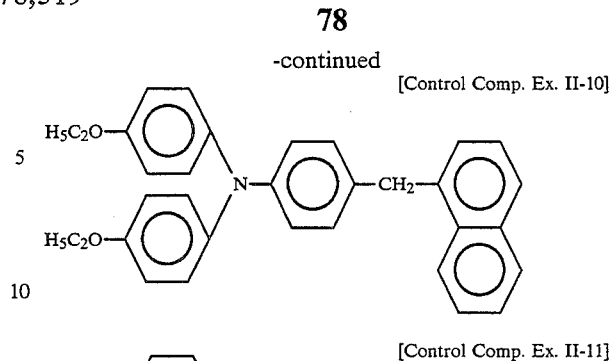
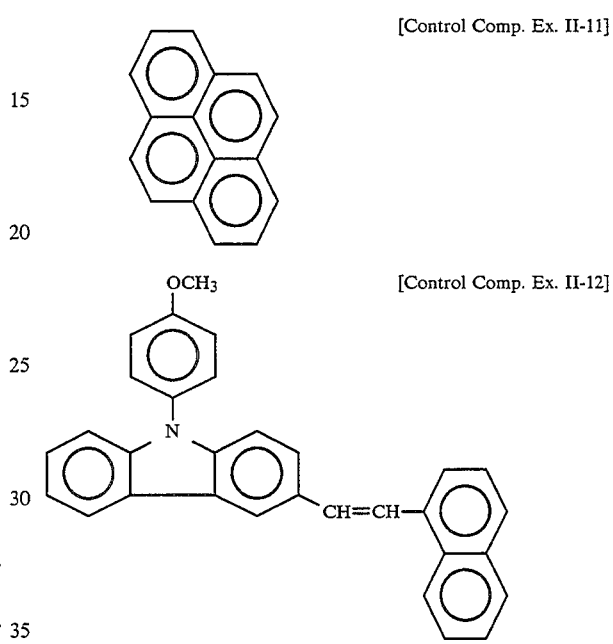

A current at a density of 7.0 mA/cm$^2$ was passed through the respective electroluminescent devices in the same manner as in Example 47. The results are shown in Table 18 below.

TABLE 18

| Control Example | Control Comp. Ex. | Applied voltage (V) | Optical output (mW/cm$^2$) |
|---|---|---|---|
| 32 | II-8 | 16.1 | ** |
| 33 | II-9 | 20.1 | ** |
| 34 | II-10 | 16.4 | ** |
| 35 | II-11 | 14.1 | 0.001 |
| 36 | II-12 | 11.9 | 0.002 |

**No optical output was observed.

As is clear from Tables 17 and 18 in comparison, the electroluminescent devices of the present invention showed much better optical output in comparison with the electroluminescent devices of the control Examples.

EXAMPLE 52

2 g of Comp. Ex. II-2, 1 g of the above-mentioned hole-transporting Compound C, 1 g of the above-mentioned electron-transporting Compound D and 2 g of polycarbonate (Mw=35,000) were dissolved in 300 ml of tetrahydrofuran to form a coating liquid. The coating liquid was then applied by a wire bar on a 50 nm-thick ITO cathode film on a glass substrate to form a 400 nm-thick layer, on which was further formed a 150 nm-thick aluminum cathode by vacuum deposition to prepare an electroluminescent device.

The anode and cathode of the electroluminescent device thus prepared were connected by a lead wire via a DC power supply, and a voltage of 10.0 volts was applied thereto, whereby a current flowed at a density of 9.6 mA/cm² and a luminescence at an optical output of 0.38 mW/cm² was observed.

What is claimed is:

1. An electroluminescent device, comprising: a pair of electrodes, and an organic compound layer disposed between the electrodes and comprising a compound having a skeleton of the following formula (II) and having a carbonyl group:

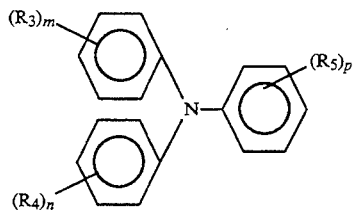

Formula (II)

wherein $R_3$, $R_4$ and $R_5$ independently denote an alkyl group, an aromatic ring group, a heterocyclic group, an alkoxy group, an aryloxy group, a halogen atom, a nitro group, a cyano group, a hydroxy group, or an amino group, and m, n and p independently denote 0 or an integer of up to 5.

2. A device according to claim 1, wherein said organic compound layer further contains a member selected from the group consisting of hole-transporting compounds, electron-transporting compounds, hole-transporting luminescent compounds, and electron-transporting luminescent compounds.

3. A device according to claim 1, wherein said organic compound layer has a multi-layer structure.

4. A device according to claim 1, wherein said organic compound layer has a multi-layer structure including a hole-transporting layer and an electroluminescent layer.

5. A device according to claim 1, wherein said organic compound layer has a multi-layer structure including a hole-transporting layer, a luminescent layer and an electron-transporting layer.

6. A device according to claim 1, wherein said compound having a skeleton of the formula (II) and a carbonyl group is contained in a proportion of 20 wt. %–100 wt. % of the organic compound layer.

7. A device according to claim 6, wherein said compound is contained in a proportion of 30 wt. %–100 wt. % of the organic compound layer.

8. A device according to claim 1, wherein said organic compound layer has a thickness of at most 2.0 μm.

9. A device according to claim 1, wherein said organic compound layer has a thickness of at most 0.5 μm.

* * * * *

UNITED STATES PATENT AND TRADEMARK OFFICE
CERTIFICATE OF CORRECTION

PATENT NO. : 5,378,519

DATED : January 3, 1995

INVENTORS : TOSHIHIRO KIKUCHI ET AL.

It is certified that error appears in the above-identified patent and that said Letters Patent is hereby corrected as shown below:

ON TITLE PAGE

At [56] References Cited

Under "FOREIGN PATENT DOCUMENTS"

"3163188  7/1991  Japan" should read
--3-163188  7/1991  Japan--.

COLUMN 1

Line 27, "chrysens," should read --chrysene,--.
Line 54, "a" should read --an--.

COLUMN 2

Line 2, "51-th" should read --51-st--.

COLUMN 53

Comp.Ex. II-51, "$C_2H_6$" should read --$C_2H_5$--.

COLUMN 62

Line 11, "luminance of" should be deleted.
TABLE 1, "(mw/$cm^2$)" should read --(mW/$cm^2$)--.

UNITED STATES PATENT AND TRADEMARK OFFICE
CERTIFICATE OF CORRECTION

PATENT NO. : 5,378,519

DATED : January 3, 1995

INVENTORS : TOSHIHIRO KIKUCHI ET AL.

It is certified that error appears in the above-identified patent and that said Letters Patent is hereby corrected as shown below:

COLUMN 63

TABLE 2, "(mw/cm$^2$)" should read --(mW/cm$^2$)--.

COLUMN 68

TABLE 7, "(mw/cm$^2$)" should read --(mW/cm$^2$)--.

COLUMN 69

TABLE 8, "(mw/cm$^2$)" should read --(mW/cm$^2$)--.

UNITED STATES PATENT AND TRADEMARK OFFICE
CERTIFICATE OF CORRECTION

PATENT NO. : 5,378,519

DATED : January 3, 1995

INVENTORS : TOSHIHIRO KIKUCHI ET AL.

It is certified that error appears in the above-identified patent and that said Letters Patent is hereby corrected as shown below:

<u>COLUMN 74</u>

TABLE 13, "(mw/cm$^2$)" should read --(mW/cm$^2$)--.

<u>COLUMN 75</u>

TABLE 14, "(mw/cm$^2$)" should read --(mW/cm$^2$)--.

Signed and Sealed this

Thirteenth Day of June, 1995

Attest:

BRUCE LEHMAN

Attesting Officer

Commissioner of Patents and Trademarks